(12) United States Patent
Lombardi

(10) Patent No.: US 8,679,990 B2
(45) Date of Patent: Mar. 25, 2014

(54) SELF-DECONTAMINATING COATINGS AND FABRICS

(76) Inventor: John L. Lombardi, Tucson, AZ (US)

(*) Notice: Subject to any disclaimer, the term of this patent is extended or adjusted under 35 U.S.C. 154(b) by 0 days.

(21) Appl. No.: 13/465,896

(22) Filed: May 7, 2012

(65) Prior Publication Data

US 2013/0012085 A1 Jan. 10, 2013

Related U.S. Application Data

(60) Provisional application No. 61/483,035, filed on May 5, 2011, provisional application No. 61/514,402, filed on Aug. 2, 2011.

(51) Int. Cl.
*B32B 3/00* (2006.01)

(52) U.S. Cl.
USPC ............. 442/59; 442/123; 442/301; 442/414; 106/287.17; 427/384; 427/385.5; 427/380

(58) Field of Classification Search
None
See application file for complete search history.

(56) References Cited

U.S. PATENT DOCUMENTS 7,259,122 B1* 8/2007 Lombardi .................. 502/132

FOREIGN PATENT DOCUMENTS

JP 09040872 A * 2/1997

OTHER PUBLICATIONS

Definition of Ambient; accessed Jan. 10, 2013, Merriam-Webster, Webster's Third New International Dictionary, Unabridged.*
Kasanen, J., Self-Cleaning Titanium Dioxide Based Multilayer Coating Fabricated on Polymer and Glass Surfaces, Nov. 25, 2008, Journal of Applied PolymerScience, vol. 111, 2597-2606.*
Sterm Chemicals, The Sterm Product Line, 2002, p. 5.*
STIC Search Report 13/465896, Jan. 6, 2013.*

* cited by examiner

*Primary Examiner* — Jennifer Chriss
*Assistant Examiner* — Frank Vineis
(74) *Attorney, Agent, or Firm* — Dale F. Regelman; Quarles & Brady LLP

(57) ABSTRACT

A self-decontaminating fabric prepared by a method, wherein the method prepares a coating solution by combining a first solution comprises a photocatalyst dissolved in an alcohol, and a second solution comprises a metal alkoxide dissolved in an organic solvent, applies the coating solution to the fabric, and dries the fabric.

16 Claims, 23 Drawing Sheets

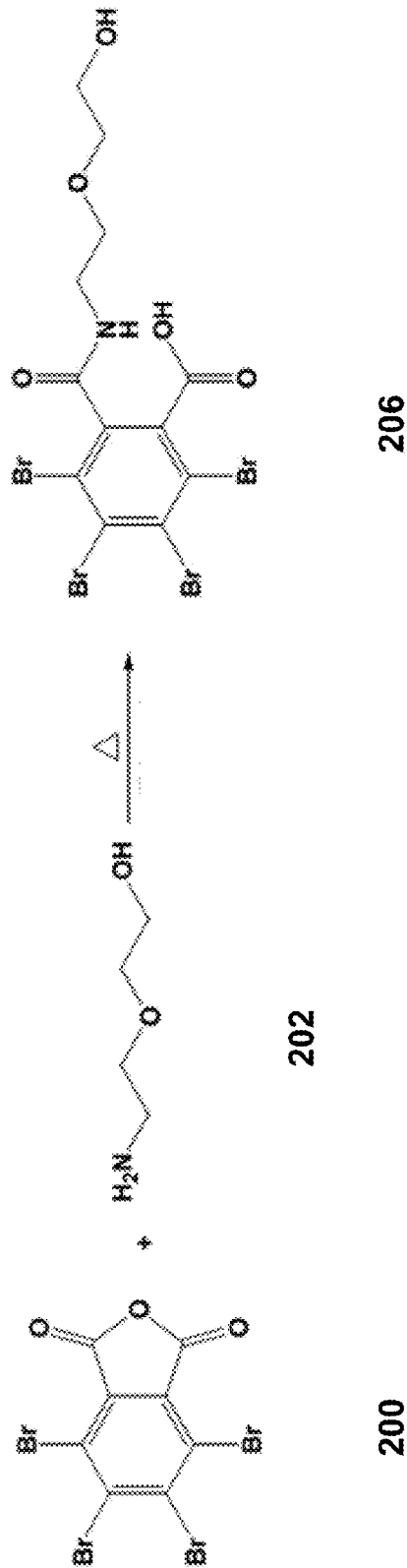
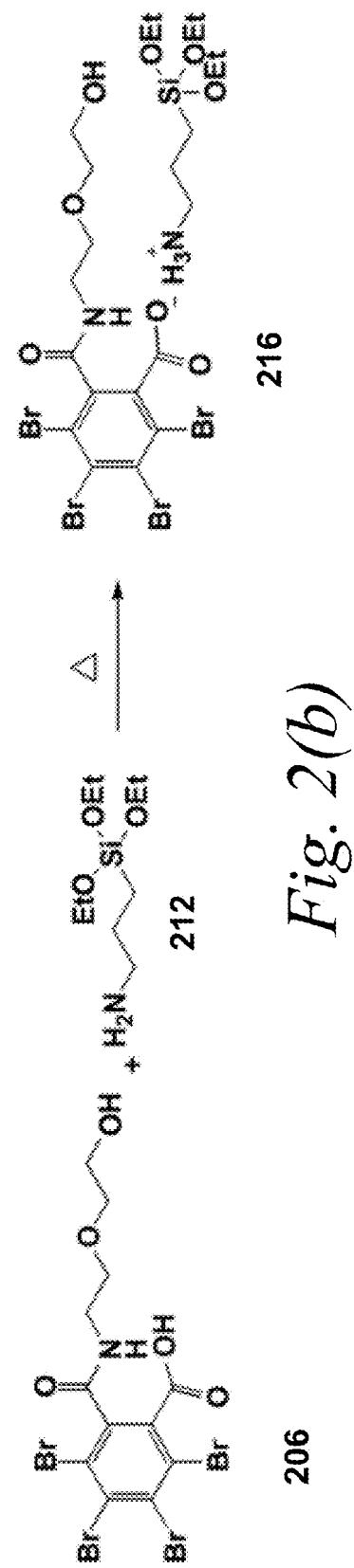
Fig. 2(a)
Fig. 2(b)

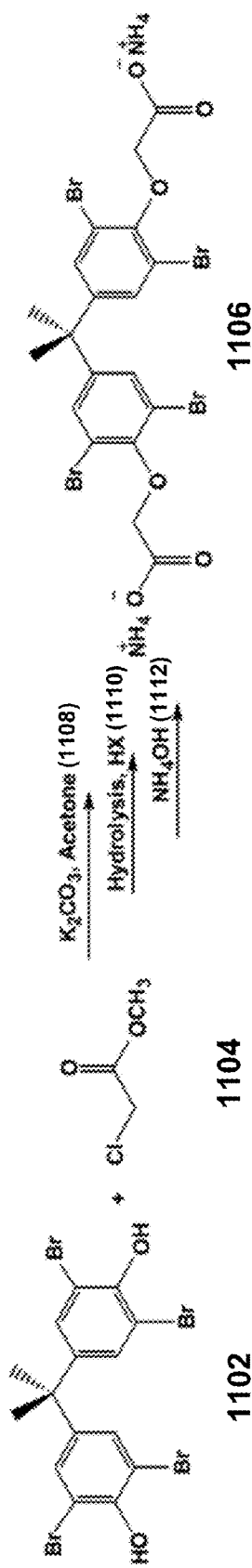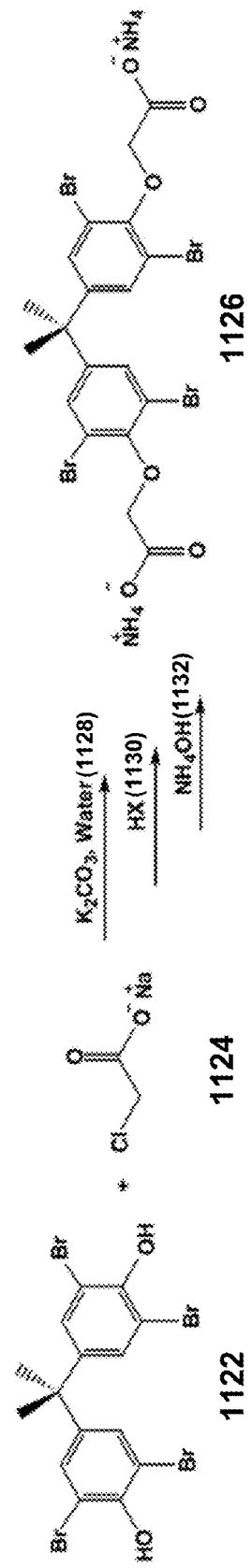
Fig. 11(a)
Fig. 11(b)

SELF-DECONTAMINATING COATINGS AND FABRICS

CROSS-REFERENCES TO RELATED APPLICATIONS

This application claims priority to, and the benefit of, U.S. Patent Application Ser. No. 61/483,035 filed May 5, 2011, the entire contents of which are incorporated herein by reference; and this application also claims priority to and the benefit of U.S. Patent Application Ser. No. 61/514,402 filed Aug. 2, 2011, the entire contents of which are incorporated herein by reference.

FIELD OF THE INVENTION

The invention relates to coatings and fabrics that decontaminate chemical agents and/or biological toxins.

BACKGROUND OF THE INVENTION

Exposure to toxic chemical and biological agents ("CBAs") is a growing concern to both military and civilian organizations alike. Areas of enhanced vulnerability include assemblies of persons, whether military or civilian, and/or environments where the risk of exposure to toxins is elevated. One such scenario includes military personnel assembled within one or more tents and/or portable shelters. Other such scenarios include research facilities, health care facilities, and other environments where there is a high risk of exposure to CBAs.

In order to mitigate the harmful effects of an exposure to CBAs, many military shelters are constructed from fabrics which include one or more polymeric materials exhibiting barrier properties to one or more toxic agents. Many of these fabrics comprise, for example, fluoropolymers such a polytetrafluoroethylene ("PTFE"). One such composite material comprises Teflon coated Kevlar. While such composites demonstrate acceptable barrier properties, these CBA barrier shelter fabrics are expensive and require multiple manufacturing operations to join various fabric segments. The high costs of materials in combination with high manufacturing costs limit the availability of such prior art fabrics for widespread use.

As a result, most real-world military shelters are not made from such fabrics. Rather, current shelters are formed using materials having inferior CBA resistance. For example, forces of the United States of America typically utilize a General Purpose Shelter Fabric ("GP Fabric") manufactured from cloth coated with polyvinyl chloride ("PVC"). GP Fabric is relatively inexpensive and affords soldiers adequate protection against inclement weather including rain, snow, wind, and dust storms. Shelters made from GP Fabric, however, offer minimal CBA protection. Such prior art shelters require an additional M28 Saranex liner to impart acceptable CBA barrier properties. As those skilled in the art will appreciate, use of such liners adds to the overall weight, cost and complexity of the shelter.

Various situations also exist within the civilian realm where personnel may be exposed to pathogens. For example, health care and research personnel are often exposed to a variety of pathogens, both organic and non-organic. To protect against pathogens, these personnel often wear special garments constructed to provide a physical barrier to prevent pathogens from passing through the garment. For example, some prior art garments are constructed from fabrics having micropores that permit the fabric to breathe, but prevent the passage of liquid, such as blood, viruses, and other toxins. While these prior art fabrics provide protection against toxins penetrating the fabrics, the toxins contacting the fabric remain active and thereby continue to pose a threat.

In addition, toxins may contaminate various hard surfaces. For example, toxins commonly come into contact with the floors, walls and ceilings within a health care facility in addition to the surfaces of the various pieces of equipment present. While these surfaces are cleaned periodically, the toxins pose a threat during the time between cleanings.

Accordingly, it would be an advance in the state of the art to provide a coating composition that can be applied to both flexible and rigid surfaces that is capable of decontaminating CBAs upon contact with the coating.

SUMMARY OF THE INVENTION

A self-decontaminating coating prepared by a method is presented. The method prepares a coating solution by combining a first solution comprises a photocatalyst dissolved in an alcohol, and a second solution comprises a metal alkoxide dissolved in an organic solvent, applies the coating solution to a surface, and dries the surface.

A self-decontaminating fabric prepared by a method is presented. The method prepares a coating solution by combining a first solution comprises a photocatalyst dissolved in an alcohol, and a second solution comprises a metal alkoxide dissolved in an organic solvent, applies the coating solution to the fabric, and dries the fabric.

BRIEF DESCRIPTION OF THE DRAWINGS

The invention will be more fully understood by referring to the following Detailed Description of Specific Embodiments in conjunction with the Drawings, of which:

FIGS. 2(a) and 2(b) show chemical reactions involved in producing Applicants' alcohol-based flame retardant coating formulation;

FIGS. 11(a), 11(b), and 12 show chemical reactions involved in producing various embodiments of Applicants' alcohol-based flame retardant coating formulation;

DETAILED DESCRIPTION OF THE PREFERRED EMBODIMENTS

I. Alcohol-Based Coating Formulation

Figure 1A:
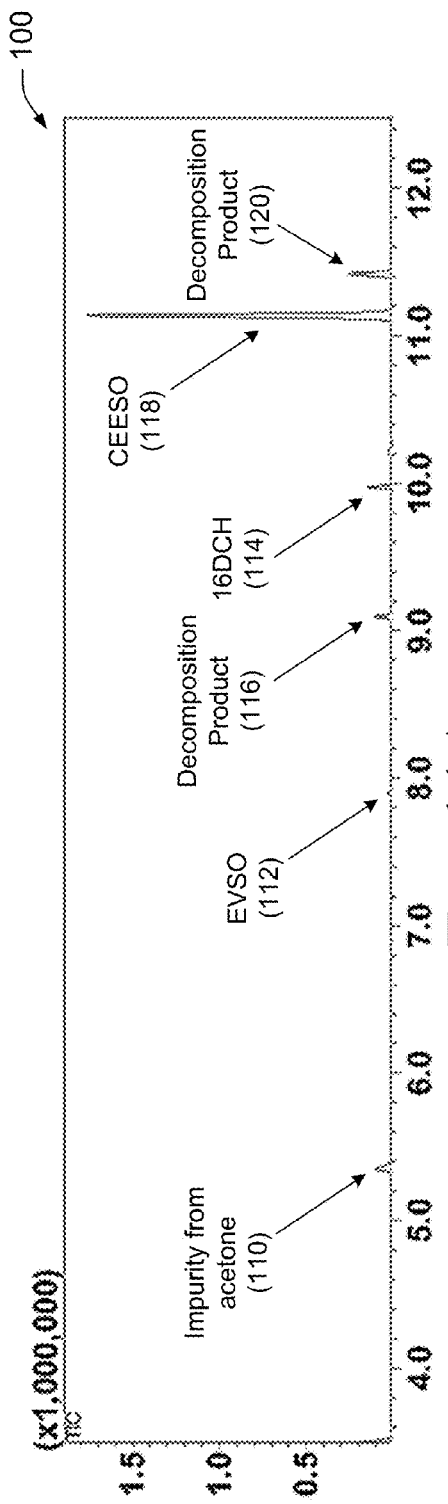
FIGS. 1(a) and 1(b) are Gas Chromatography-Mass Spectrometry chromatogram for Applicants' AlPc-Cl/diol/Al-Alkoxide coating formulation and Applicants' chlorosulfonated AlPc/Silane coating formulation, respectively.

Applicant has developed a self-decontaminating coating that can be applied to hard and soft surfaces. The coating is comprised of a singlet oxygen generating photocatalyst incorporated in a condensate formed from a metal alkoxide and a polyfunctional alcohol. Applicants' coating exhibits excellent wettability on many surfaces, including hard surfaces, such as glass, and flexible surfaces, such as natural and synthetic fabrics. The singlet oxygen generated by the photocatalyst has been shown to be an effective oxidizing agent capable of decomposing CBAs.

The photocatalyst is incorporated within the condensate such that the photocatalyst is resistant to washing out upon exposure to a solvent known to dissolve the photocatalyst. The photocatalyst molecules incorporated within the condensate, however, retain the ability to produce singlet oxygen. As a result, Applicants' coating is effective in decomposing CBAs.

In one embodiment, Applicants' coating is formed by preparing two components, Part A and Part B, combining the components to form a low viscosity solution, applying the solution to a surface, and heating the solution to form a condensate, which adheres to the surface.

A. Part A Formulation

In one embodiment, Part A is a dye solution formed by combining a photocatalyst with a polyfunctional alcohol.

In various embodiments, the photocatalyst comprises a photocatalyst selected from the group consisting of Acetonaphthones, Acetophenone, Acridines, Anthracenes, Anthraquinones, Anthrones, Azulenes, Benzils, Benzophenones, Benzopyranones, Benzoquinones, Flavones, Camphoroquinone, Chrysenes, 7-Dehydrocholesterols, Ergosterols, Fluorenes, Fluorenones, Eosins, Fluoresceins, Phloxines, Rose Bengals, Erythrosins, Indoles, Naphthalenes, Phenanthrenes, Phenazines, Thionines, Azures, Toluidine Blue, Methylene Blues, Pyrenes, Quinoxalines, Retinols, Riboflavins, Rubrenes, Bacteriochlorophylls, Chlorophylls, Pheophytins, Pheophorbides, Protochlorophylls, Coproporphyrins, Fullerenes, Porphyrins, Metallo Porphyrins, Porphines, Rubrenes, and Phthalocyanines, including unmetalated, metalated heterocyclic Al, Si, Zn Phthalocyanine, or a combination thereof. In one embodiment, the photocatalyst is a metalated heterocyclic aluminum phthalocyanine chloride 1 ("AlPc-Cl") depicted below.

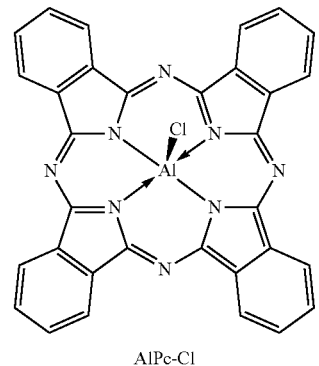

AlPc-Cl

Additional examples of specific photocatalysts compatible with Applicants' coating include, without limitation, those provided below as Photocatalyst 1-43.

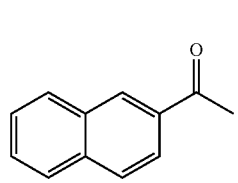 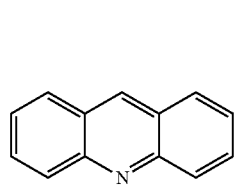 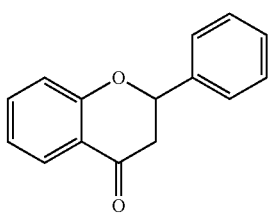 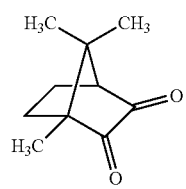

Photocatalyst 1
Acetonaphthone
CAS: 93-08-3; √~0.5–0.7

Photocatalyst 2
Acridine
CAS: 260-94-6; √~0.8

Photocatalyst 3
Flavone
CAS: 525-82-6; √~0.5

Photocatalyst 4
Camphoroquinone
CAS: 10373-78-1; √~0.8
CAS 10373-78-1

-continued

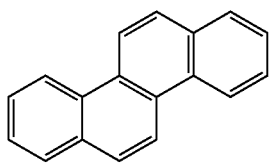

Photocatalyst 5
Chrysene
CAS: 218-01-9; √~0.6
CAS 218-01-9

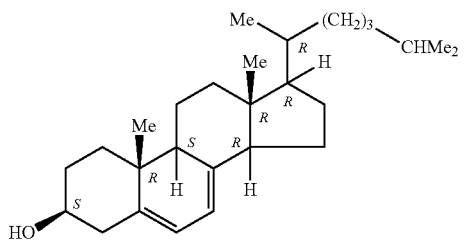

Photocatalyst 6
7-Dehydrocholesterol CAS:
434-16-2; √~0.8

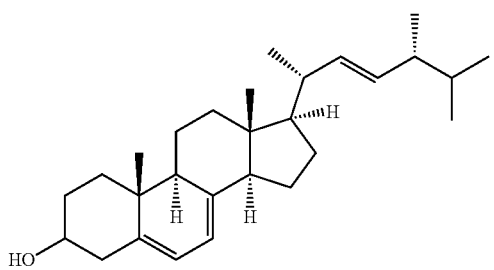

Photocatalyst 7
Ergosterol
CAS: 57-87-4; √~0.8

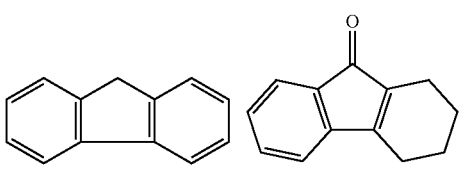

Photocatalyst 8
Fluorene
CAS: 86-73-7; √~1

Photocatalyst 9
Fluorenone
CAS: 486-25-9; √~0.8

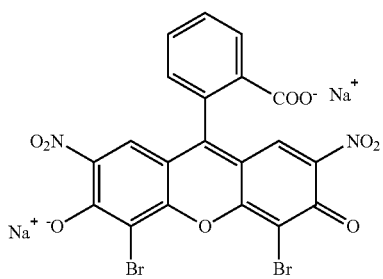

Photocatalyst 10
Eosin B
CAS: 548-24-3;
√~0.3-0.5

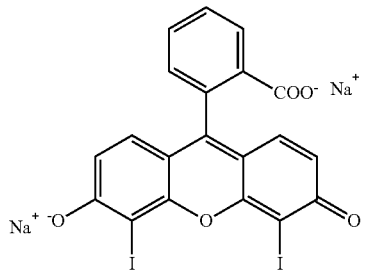

Photocatalyst 11
DiiodoFluorescein
CAS: 33239-19-9;
√~0.3-0.5

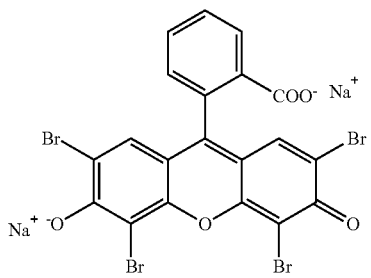

Photocatalyst 12
Eosin Y
CAS: 17372-87-1;
√~0.5-0.9

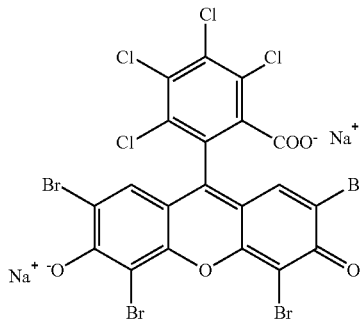

Photocatalyst 13
Phloxine B
CAS: 18472-87-2;
√~0.4-0.6

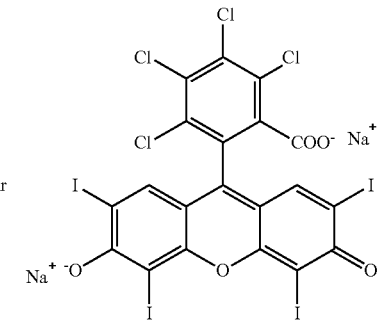

Photocatalyst 14
Rose Bengal DiSodium
CAS: 632-69-9; √~0.8

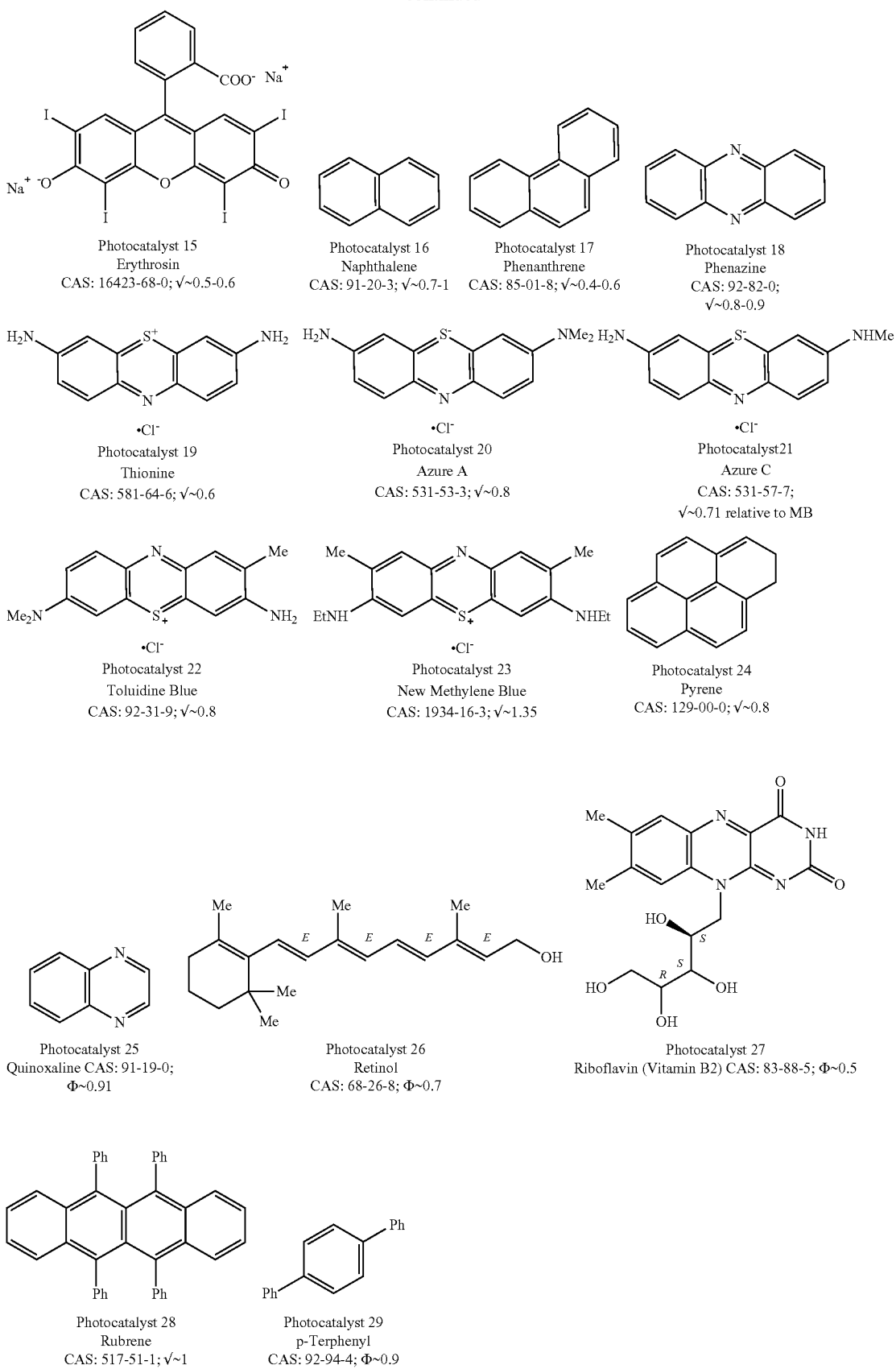

-continued
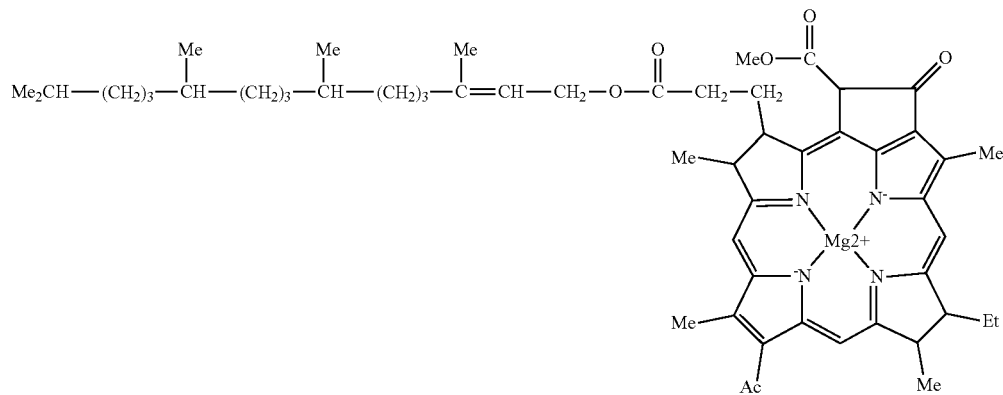
Photocatalyst 30
Bacteriochlorophyll A
CAS: 17499-98-8; √~0.4
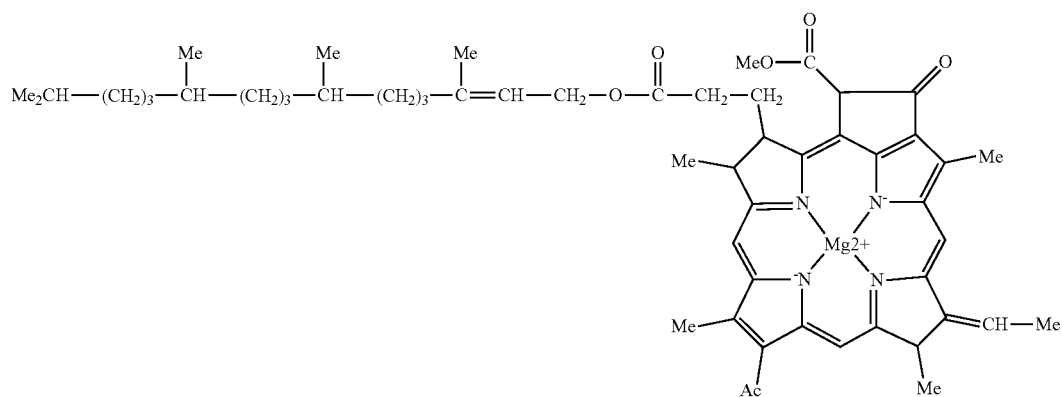
Photocatalyst 31
Bacteriochlorophyll B
CAS: 53199-29-4; √~0.5
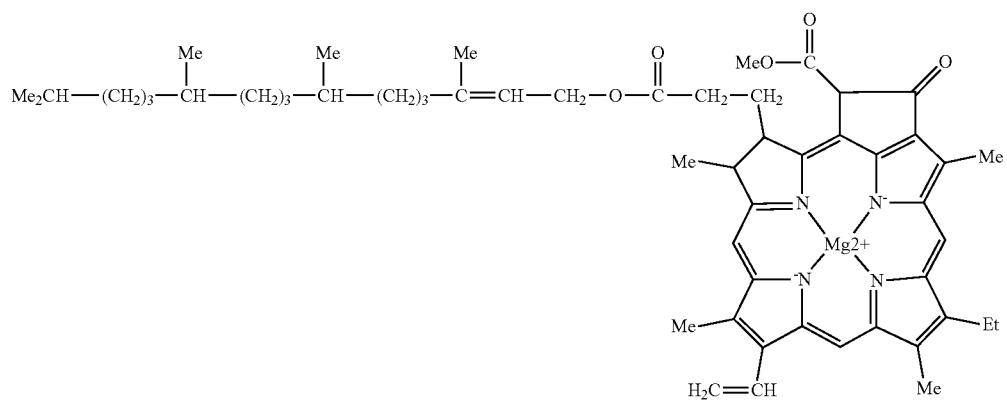
Photocatalyst 32
Chlorophyll A
CAS: 479-61-8; √~0.5–0.7

-continued
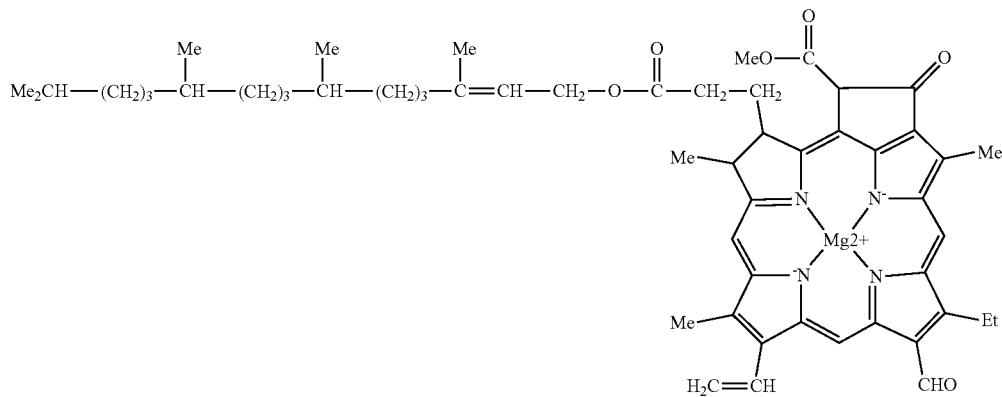
Photocatalyst 33
Chlorophyll B
CAS: 519-62-0; √~0.7-0.8
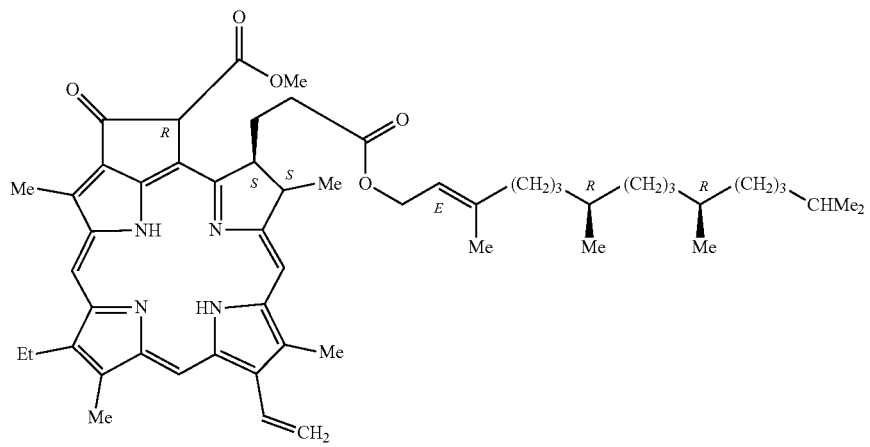
Photocatalyst 34
Pheophytin A
CAS: 603-17-8; √~0.6-0.7
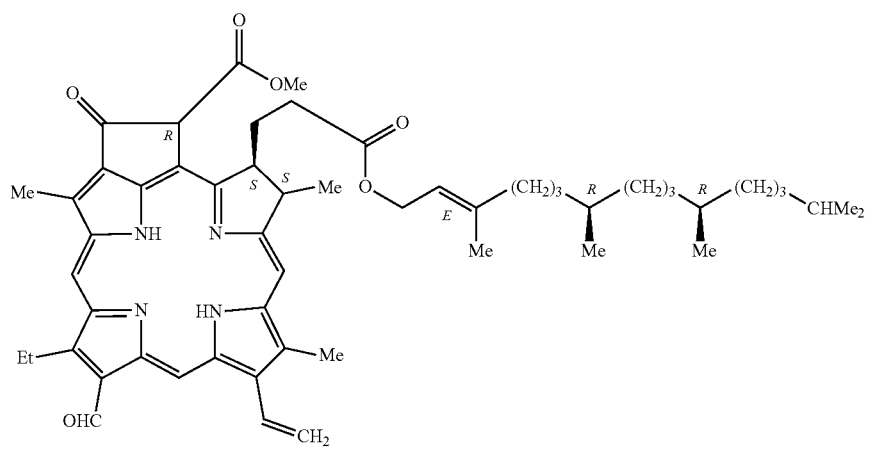
Photocatalyst 35
Pheophytin B
CAS: 3147-18-0; √~0.7-0.8

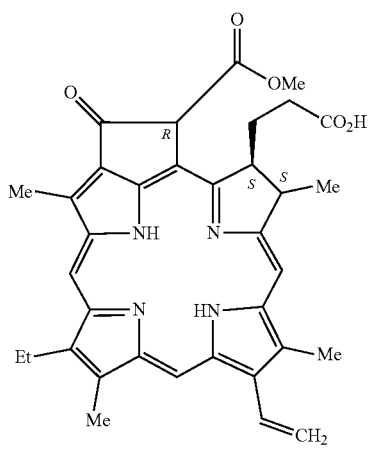
Photocatalyst 36
Pheophorbide A
CAS: 15664-29-6; √~0.4-0.7
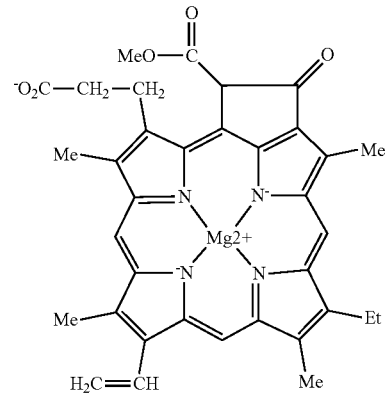
•H+
Photocatalyst 37
Protochlorophyllide
CAS: 20369-67-9; √~0.7-0.8
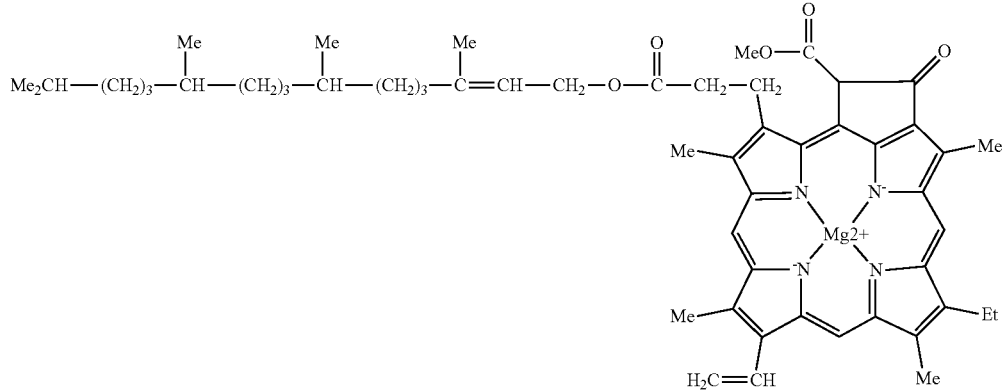
Photocatalyst 38
Protochlorophyll
CAS: 14751-08-7; √~0.60
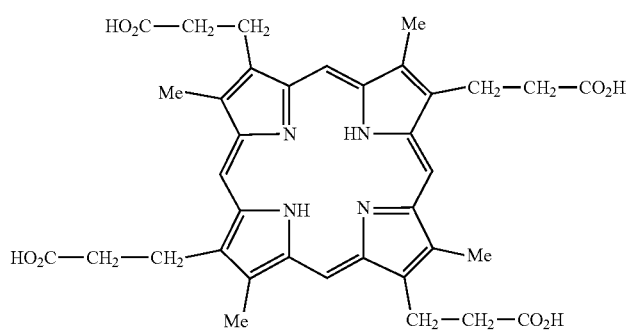
Photocatalyst 39
Coproporphyrin I
CAS: 531-14-6; √~0.6
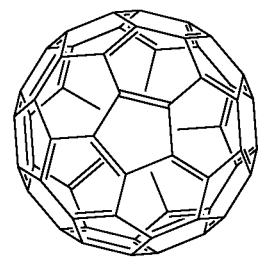
Photocatalyst 40
Fullerene-$C_{60}$
CAS: 99685-96-8; Φ~1

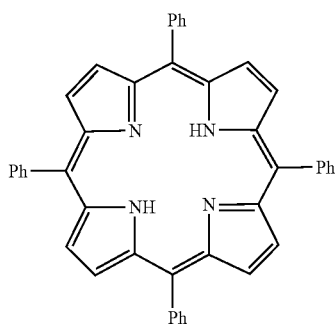

Photocatalyst 41
Tetraphenyl porphyrin
CAS: 917-23-7; √~0.6-0.7

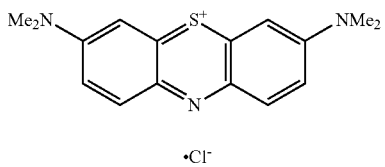

•Cl⁻
Photocatalyst 42
Methylene Blue
CAS: 61-73-4; √~0.5

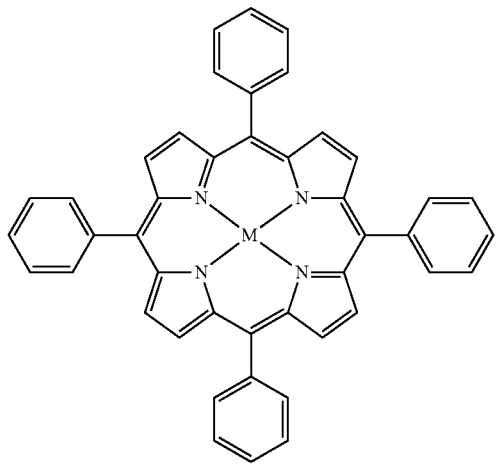

M = Cd; CAS: 14977-07-2
M - AlCl; CAS: 71102-37-9
M = GaCl; CAS: 78833-52-0
M = Zn; CAS: 14074-80-7
M = SnCl$_2$; CAS: 26334-85-0

Photocatalyst 43
Metallo-Tetraphenyl porphyrin
√~0.6-0.9

In various embodiments, the polyfunctional alcohol is a diol, a polyol, a polyfunctional alcohol-terminated polymer, or other multifunctional alcohol. Examples of diols include, without limitation, ethylene glycol, propylene glycol, diethylene glycol (sold in commerce by Alfa Aesar), triethylene glycol, tetraethylene glycol (sold in commerce by Alfa Aesar and The Dow Chemical Company), polyethylene glycol (sold in commerce by The Dow Chemical Company), polyethylene oxide, polytetramethylene glycol, polycaprolactone diol and related aliphatic or aromatic polyester diols, aliphatic or aromatic polycarbonate diols, any other aromatic diol, butanediol, neopentyl glycol, heptanediol, hexanediol, 2-butene-1,4-diol, 2-butyne-1,4-diol, pentaerythritol, 1,3-propane diol (sold in commerce by Shell Chemical Company), trihydroxypropane, cyclohexane diol, catechol, phenolic resin, melamine resin, urea-formaldehyde resin, bisphenol A, bisphenol AF, bisphenol F, bisphenol B, bisphenol BP, bisphenol E, bisphenol S, polyfunctional phosphate esters, carboxylates, silanols, silyl ester, or any combination thereof.

Examples of polyfunctional alcohol-terminated polymers include, without limitation, polyester diol (sold in commerce by King Industries as K-Flex® 188), polyester polyol (sold in commerce by King Industries as K-Flex® A307), and polyurethane polyol (sold in commerce by King Industries as K-Flex® UD-320-100), polyvinyl alcohol, thiol alcohol, polystyrene allyl alcohol, or similar alcohol with hydroxyl or carboxylate functional groups.

In some embodiments, the photocatalyst/polyfunctional alcohol mixture is further diluted by addition of a monofunctional alcohol, an organic solvent, or combination thereof. Examples include, without limitation, ethanol, n-butanol, 2-propanol, 2-butanol, and a mixture of 2-propanol/toluene.

B. Part B Formulation

In one embodiment, the Part B formulation is a metal alkoxide solution formed by dissolving a metal alkoxide in an organic solvent. The metal alkoxide is represented by $M(OR)_x$. In various embodiments, M is aluminum, titanium, silicon, zirconium, or a combination thereof. In various embodiments, OR is an alkyl or aryl alkoxide, such as methoxide, ethoxide, isopropoxide, butoxide, sec-butoxide, phenoxide, fatty alcoxide or mixtures thereof. The metal alkoxide may also be in a chelated form with the chelating agents including, without limitation, carboxylates (e.g. alkyl or aryl) or enolizable compounds, such as acetylacetone, ethyl acetoacetate, benzoyl acetone, and acetanilide.

In one embodiment, the Part B formulation consists of a metal alkoxide powder only (i.e., the metal alkoxide powder is not dissolved in a solvent). In one embodiment, the Part B formulation comprises metal alkoxide combined with an organic solvent or monofunctional alcohol that forms an azeotrope with water. Due to the undesired hydrolyzation of the metal alkoxide when exposed to water, such as moisture in the air, a solvent that forms an azeotrope with water assist in removing water from the solution as the solvent evaporates.

C. General Considerations

The selection of a particular polyfunctional alcohol in the Part A solution and metal alkoxide in the Part B solution is determined based on the relative volatility of the polyfunctional alcohol and the alkoxy group on the metal alkoxide. In one embodiment, the polyfunctional alcohol has a relatively low volatility as compared to the alkoxy group. As the combined Part A/Part B solution is heated, the lower volatility alkoxy groups are evaporated off, causing the polyfunctional alcohol to condense with the metal alkoxide.

In various embodiments, Applicants' coating formed from a metal phthalocyanine and a metal alkoxide may contain the same or mixed metal groups. For example, the metal in the phthalocyanine and the alkoxide may be the same (i.e., aluminum phthalocyanine chloride and aluminum alkoxide. In another example, the metal in the phthalocyanine and the alkoxide may be different (i.e., zinc phthalocyanine and titanium alkoxide). In yet another example, the phthalocyanine and the alkoxide may each contain mixed metals (i.e., a zinc phthalocyanine chloride/aluminum phthalocyanine chloride mixture and an aluminum alkoxide/silicon alkoxide mixture.

When the Part A and Part B components are combined, applied to a surface and heated, the relatively high volatility alkoxy groups on the metal alkoxide are evaporated off allowing the alkoxide to co-condense with the polyfunctional alcohol. This co-condensation is likely a result of an exchange of alkoxy groups on the alkoxide for the hydroxyl functional groups on the polyfunctional alcohol. An equilibrium between the alkoxy/hydroxyl groups on the alkoxide develops in solution. As the higher volatility alkoxy groups evaporate due to heating, the equilibrium shifts to the hydroxyl groups.

If Part A and Part B are mixed in an open-air container, precipitants may be observed, which can be removed by filtration before applying the coating step. The coating solution should be stored in a sealed container to avoid exposing the metal alkoxide to moisture, which may result in the hydrolyzation of the metal alkoxide and formation of a precipitant.

In some embodiments, such as when using aluminum alkoxide, titanium alkoxide, and zirconium alkoxide, the alkoxy/hydroxyl exchange takes place at room temperature. In one embodiment, such as when using silicon alkoxide, a catalyst is necessary to facilitate this exchange. In one embodiment, the catalyst is another type of alkoxide. In this mixed metal system, a combination of silicon alkoxide and zirconium alkoxide is used as the metal alkoxide. The zirconium alkoxide catalyzes the alkoxy/hydroxyl exchange on the silicon alkoxide.

In one embodiment, the surface to be treated is coated with a urethane primer before application of the metal alkoxide/polyfunctional alcohol/metal phthalocyanine coating. The urethane primer was shown to increase the singlet oxygen generation of the metal Phthalocyanine photocatalyst. In one embodiment, the urethane primer is a emulsion pre-dried on the surface before the alkoxide/polyfunctional alcohol/metal phthalocyanine coating is applied.

Applicant has disposed his metal alkoxide/polyfunctional alcohol/metal Phthalocyanine composition onto various substrates using conventional coating equipment and methods. The following Examples are presented to further illustrate to persons skilled in the art how to make and use the invention. These Examples are not intended as a limitation, however, upon the scope of Applicants' invention.

D. Example 1

1. Preparation of Part A

An Aluminum Phthalocyanine Chloride ("AlPc-Cl"), sold in commerce by Sanyo Color Works, Ltd., is combined with the diol. The mixture is heated to between about 130° C. and about 150° C. to maximize the dissolution of the AlPc powder in the diol. The saturated AlPc-Cl/diol solution is further diluted by an alcohol. In various embodiments, the alcohol includes, without limitation, ethanol, 2-propanol, 2-butanol, and a 2-propanol/toluene mixture.

One embodiment of a Part A formulation where the diol is polyethylene glycol having a molecular weight of approximately 400 ("PEG 400") is provided in Table 1 below. PEG 400 is sold in commerce by The Dow Chemical Company as Carbowax™ 400.

TABLE 1

| Component ID | Component | Quantity (grams) |
| --- | --- | --- |
| 1 | Aluminum Phthalocyanine Chloride (AlPc-Cl) | 0.1 |
| 2 | PEG 400 | 7.0 |
| 3 | 2-Propanol | 118.3 |

Another embodiment of a Part A formulation where the diol is tetraethylene glycol is provided in Table 2 below.

TABLE 2

| Component ID | Component | Quantity (grams) |
| --- | --- | --- |
| 1 | Aluminum Phthalocyanine Chloride (AlPc-Cl) | 0.05 |
| 2 | Tetraethylene glycol | 4.00 |
| 3 | 2-Propanol | 202.50 |

In the embodiments provided in Table 1 and 2 above, Component 1 and Component 2 are combined to form a solution. The solution is heated to maximize the dissolution of Component 1 in Component 2. The solution is allowed to cool, after which Component 3 is added.

In another embodiment, a Part A component is prepared by a process that does not require a heating step to dissolve the AlPc-Cl. The AlPc-Cl is dissolved directly in an alcohol, such as ethanol, 2-propanol, 2-butanol, or a 2-propanol/toluene mixture. Although, AlPc-Cl has poor solubility in these solvents, only a very small amount of AlPc-Cl is added to a relatively large quantity of alcohol. The specific amounts of each component are determined based on the solubility of AlPc-Cl in the particular alcohol. As such, an amount of AlPc equivalent to the maximum solubility in the particular alcohol is used to form a saturated AlPc-Cl/alcohol solution. In one embodiment, about 0.001 grams of AlPc is added to about 5 grams of 2-propanol. The saturated AlPc-Cl/alcohol solution can be used as a stock solution, which is further diluted with an alcohol to the desired coating concentrations when needed.

The Part A solution is prepared by combining the diluted AlPc-Cl/alcohol solution with a polyfunctional alcohol under vigorous mixing. The formulation for this Part A embodiment, which does not require heating, is provided in Table 3 below.

TABLE 3

| Component ID | Component | Quantity (grams) |
|---|---|---|
| 1 | Aluminum Phthalocyanine Chloride (AlPc-Cl) | 0.05 |
| 2 | 2-Propanol | 110.00 |
| 3 | 2-Propanol | 348.49 |
| 4 | Tetraethylene Glycol | 5.50 |

A saturated stock solution is created by dissolving Components 1 and 2. The stock solution is later diluted by adding Component 3. The final Part A solution is prepared by adding Component 4 under vigorous mixing.

2. Preparation of Part B

A metal alkoxide solution is prepared by dissolving aluminum isopropoxide or aluminum sec-butoxide with or without a chelating agent in toluene. Aluminum isopropoxide is described by the formula $Al[OCH(CH_3)_2]_3$. Aluminum sec-butoxide is described by the formula $Al(OCH[CH_3]C_2H_5)_3$. The mixture is exposed to agitation (either stirring or sonication) to promote the dissolution of non-chelated aluminum isopropoxide in the toluene.

One embodiment of a Part B formulation is provided in Table 4 below.

TABLE 4

| Component | Quantity (grams/mmols) |
|---|---|
| Aluminum isopropoxide | 2.64/12.9 |
| Toluene | 5/— |

3. Preparation of Coating Solution

A quantity of Part B is added to a quantity of Part A solution under a vigorous stirring to form the coating solution. The amount of Part B added to the Part A is dependent on the type of polyfunctional alcohol used in Part A. In one embodiment, the amount of Part B is selected such that a 1:1 reaction stoichiometry exists between the alkoxy groups on the aluminum alkoxide and the hydroxyl groups on the polyfunctional alcohol.

One example of a coating solution is provided is Table 5 below.

TABLE 5

| Part | Component | Quantity |
|---|---|---|
| Part A | AlPc-Cl/tetraethylene glycol diluted solution | 5.1 |
| Part B | Al-isopropoxide/toluene (2.64 g/5 g) | 0.1 |

4. Coating Process

The coating is applied to a surface using conventional techniques and heated to form the polyfunctional alcohol/metal alkoxide condensate. In different embodiments, the coating can be applied to the surface by spray coating or by calendaring the coating on the surface. In different embodiments, the surface is a nonwoven fabric, a woven fabric, a non-porous surface, such as glass, or a porous surface, such as painted drywall. In one embodiment, the coating is applied to the spunbond top (i.e., outer) layer of the nonwoven fabric.

The treated surface is dried under the application of heat to drive off the monofunctional alcohol or the organic solvent. The resulting coating, formed by the aluminum alkoxide, polyfunctional alcohol, and the AlPc-Cl photocatalyst, adheres to the applied surface. The composition, while uncharacterized, is likely a co-condensate formed between the aluminum alkoxide and the polyfunctional alcohol which securely enmeshes the individual AlPc-Cl molecules. Upon washing the treated surface with a known solvent of AlPc-Cl, no detectable amount of AlPc-Cl was present in the extracted solvent, indicating that the AlPc-Cl is securely integrated in, and on, the coating.

In one embodiment, the coating solution was applied on a 5"×10" section of a nonwoven polyolefin fabric, which is sold in commerce by Kappler as ProVent 10,000. The fabric was tested with and without a polyurethane pretreatment. The polyurethane pretreatment is an emulsion pre-dried on the fabric and is sold in commerce as Witcobond 281F by Chemtura. The coating solution uptake was around 4-4.5 grams. The treated fabric sections were dried in a convection oven at 80° C. for 26 minutes.

The aluminum alkoxide/polyfunctional alcohol/AlPc-Cl coating solution has been shown to have high wettability on a variety of hard and soft surfaces. In addition, the dried aluminum alkoxide/polyfunctional alcohol/AlPc-Cl coating has been shown to securely adhere to an applied surface and remain intact as the surface is washed with solvents, creased, bent, flexed and otherwise deformed. In contrast, a coating formulation including only Part A (i.e., where the Part A solution is applied directly to a surface, without combining with Part B, and subsequently dried) readily washes off the applied surface when exposed to a solvent.

5. Surface Reactivity Test Preparation

A 1"×1" sample of ProVent 10,000 nonwoven fabric was prepared. The sample was pretreated with a polyurethane pretreatment and Applicants' AlPc-Cl/tetraethylene glycol/Aluminum isopropoxide coating. The sample was then irradiated with light at an intensity of about 100,000 lux for 30 minutes.

The sample was exposed to 5 μL of 98% chloroethyl ethyl sulfide (CEES), which is sold in commerce by Sigma-Aldrich. CEES is a mustard gas analogue, commonly used to test the efficacy of compositions in decomposing CBAs. The sample was exposed to a solvent, acetone, to wash any soluble substances from the sample. The solution of acetone and any dissolved substances was extracted.

The solution was analyzed with a gas chromatograph/Mass Spectrometer (GC-MS). The GC-MS analytical conditions were as follows. GC: Oven Heating Conditions: 60° C. (5 min), 20° C./min to 160° C. (2 min), 20° C./min to 250° C. (20 min); GC: Injection 250° C.; MS: Interface 270° C.; MS: Ion source 200° C.

6. Surface Reactivity Test Results

Referring to FIG. 1(a), a GC Chromatogram 100 of the solution mixture extracted off an irradiated nonwoven fabric sample by acetone is depicted. The sample was coated with Applicants' AlPc-Cl/diol/Al-Alkoxide coating formulation, exposed to a quantity of CEES and irradiated for 30 minutes, as described above. Peaks in the GC Chromatogram 100 represent components present in the acetone solution. The area under each peak represents the amount of the component present in the solution. Peak 110 represents impurities present in the acetone before the acetone was applied to the sample. Peak 114 represents 1,6-dichlorohexane, an impurity present in the commercial CEES product. Peaks 116 and 120 are additional products from the decomposition of CEES.

The absence of a peak for CEES on the GC Chromatogram 100 indicates that all measurable amounts of CEES were decomposed by Applicants' coating. More specifically, Applicants' coating oxidized the CEES to form chloroethyl ethyl sulfoxide (CEESO), which is represented by peak 118. Another decomposition product of CEES present in a small quantity is ethyl vinyl sulfoxide, represented by peak 112.

Figure 1B:
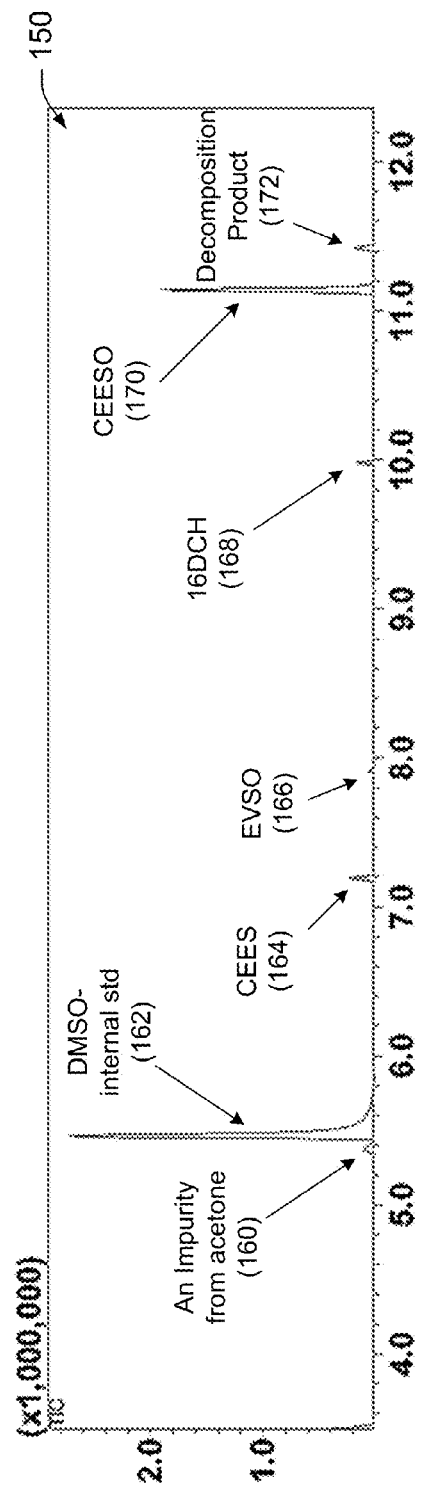

Referring to FIG. 1(b), a GC Chromatogram 150 of the solution mixture extracted off an irradiated nonwoven fabric sample by acetone is depicted. The sample was coated with polyurethane and subsequently coated with an AlPc-Cl/Silane coating formulation, exposed to a quantity of CEES and irradiated for 60 minutes.

Peaks in the GC Chromatogram 150 represent components present in the acetone solution. The area under each peak represents the amount of the component present in the solution. Peak 160 represents impurities present in the acetone before the acetone was applied to the sample. Peak 162 represents dimethyl sulfoxide, which is an internal standard used to adjust the measurement peaks based on a known quantity. Peak 168 is 1,6 dichlorohexane, an impurity present in the commercial CEES product.

A large CEESO peak 170 indicates that the majority of the CEES present has been oxidized. The ethyl vinyl sulfoxide peak 166, another product of the decomposition of CEES, is also present. A small amount of CEES was present in the solution as indicated by the CEES peak 164.

As indicated by FIGS. 1(a) and 1(b), the surface treated with the AlPc-Cl/diol/Al-Alkoxide formulation is substantially more reactive than the surface treated with the AlPc-Cl/Silane/polyurethane pre-coat formulation. The AlPc-Cl/Silane coating formulation was observed to decompose most of the CEES after 60 minutes of irradiation. In contrast, no measurable quantity of CEES was observed with the AlPc-Cl/diol/Al-Alkoxide formulation after 30 minutes of irradiation (one half of the exposure time used for the AlPc-Cl/Silane coating formulation).

The efficacy of Applicants' coating in decomposing CEES, a mustard gas analog, shows the ability of Applicants' coating to produce singlet oxygen that is available to react with exposed toxic chemical and pathogens. The singlet oxygen produced by Applicants' coating is likewise available to react with and decompose other known toxic chemicals and pathogens. For example, singlet oxygen is known to damage biological systems by reacting with mercaptans (thiols) present in biological systems (see Devasagayam, et al, Singlet oxygen induced single-strand breaks in plasmid pBR322 DNA: the enhancing effect of thiols, Biochim Biophys Acta. 1991 Mar. 26; 1088(3):409-12).

7. Fabric Breathability Tests Results

A sample of Kappler ProVent 10,000 fabric was treated with Applicants' coating prepared according to Table 6 below.

TABLE 6

| Component ID | Component | Component Quantity (grams) | Coating Quantity (grams) |
|---|---|---|---|
| Part A | Aluminum Phthalocyanine Chloride (AlPc-Cl) | 0.05 | 1.6 |
|  | Tetraethylene Glycol | 4.00 |  |
| Part B | Aluminum isopropoxide | 2.64 | 1.6 |
|  | Toluene | 5.00 |  |
| Dilutant | 2-Propanol |  | 80 |

Part A is prepared by combining the AlPc-Cl with the tetraethylene glycol in the quantities presented in the Component Quantity column. Part B is prepared by combining the aluminum isopropoxide with the toluene in the quantities presented in the Component Quantity column. The coating solution is prepared by mixing Part A, Part B, and dilutant, isopropyl alcohol, in the quantities presented in the Coating Quantity column.

The coating was applied to a 13"×17" sample of Kappler ProVent 10,000 nonwoven polyolefin fabric. 22.58 grams of the coating was used to cover the entire area of the sample. The coated sample was dried at 80° C. for 26 minutes. The weight gain of the dried sample was 0.36 grams.

The moisture vapor transmission rate (MVTR) was measured for two samples. MVTR is the measure of the passage of water vapor through a material. With regard to fabrics, MVTR is a measure of breathability. MVTR results for the samples are provided in Table 7 below.

TABLE 7

| Sample | MVTR (g/m$^2$/24 hrs) | MVTR % (open cell %) |
|---|---|---|
| 1 | 538.947 | 41.92 |
| 2 | 690.343 | 21.36 |

The MVTR value of uncoated ProVent 10,000 is about 1000. As shown in Table 7, while Applicants' coating resulted in a lower MVTR, the MVTR of the coated fabric remains within acceptable levels of breathability.

8. Fabric Bonding Tests

The seaming techniques used to assemble modern garments include stitching, heat sealing and ultrasonic seaming one or more fabrics. Heat sealing and/or ultrasonic seams are often used in garments where toxins and pathogens are likely present. As such, any decontamination fabrics should be compatible with these seaming techniques to avoid additional cost in garment construction. Samples of fabric coated with Applicants' aluminum alkoxide/diol/AlP-Cl composition were seamed using standard heat and ultrasonic seaming processes. A pull test was conducted to test the mechanical integrity of the seams formed. In both cases, the fabric fibers failed before the seam. This indicates that the structural integrity of the seam is greater than that of the fabric itself. This further indicates that Applicants' coating will not hinder the ability to manufacture the garment using coated fabric by standard seaming techniques.

The seaming conditions for a sample of ProVent 10,000 treated with applicant's aluminum alkoxide/diol/AlPc-Cl coating is presented in Table 8 below.

TABLE 8

| Seam Type | Parameter | Value |
|---|---|---|
| Heat Sealed/Taped | Air Temperature | 375° C. |
| | Nozzle Air Flow | 8 psi/0.9 bar |
| | Roller Pressure | 75 psi/5 bar |
| | Speed | 6.0 |
| | Engagement | low |
| | Nozzle Position | Set 1 |
| Ultrasonic | Pressure | 3.75 |
| | Speed | #1-1.5 #2-1.5 |
| | Output | 4.5 |

In one embodiment, Applicants' coating is applied to fabric used to make one-use (i.e., disposable) suits that include multiple seams.

II. Dicarboxylic Acid Water-Based Coating Formulation

Applicant has developed a dicarboxylic acid water-based coating formulation that is compatible with the photocatalysts described in Section I above. Applicants' coating is prepared by creating a solution comprising a dicarboxylic acid, a metal carbonate, and a photocatalyst. The solution is applied to a surface to form a coating and dried. As the coating dries, a condensate forms that includes the photocatalyst.

The following Examples are presented to further illustrate to persons skilled in the art how to make and use the invention. These Examples are not intended as a limitation, however, upon the scope of Applicants' invention.

A. Example 2

1. Overview

Applicants' coating is prepared using the chemicals in the quantities provided in Table 9. The steps to create Applicants' coating include creating two solutions, Solution A and Solution B, combining the two solutions to form a coating solution, applying the coating solution to a surface, and applying heat to the surface to drive off volatile components from the coating solution to form a coating.

TABLE 9

| Solution | Component | Function | Quantity (grams) | Quantity (wgt. %) |
|---|---|---|---|---|
| A | Adipic Acid | Monomer | 0.26 | 3.89 |
| | Aqueous Ammonium Hydroxide Solution (29 wt % NH$_3$) | Acid Neutralizing Agent | 2.98 | 44.6 |
| | Ammonium Carbonate | pH Buffer | 0.05 | 1.35 |
| | Bacote 20 (20.3 wt % ZrO$_2$ solids) | Crosslinking Agent | 2.27 | 34.0 |
| B | Tinolux BMC | Photocatalyst | 0.01 | 0.15 |
| | Distilled Water | Coating Vehicle | 1.07 | 16.01 |
| | Ammonium Carbonate | pH Buffer | 0.04 | 1.35 |
| | Q2-5211 | Superwetting agent | one drop | 16.01 |

2. Preparation of Solution A

The steps for preparing Solution A include dissolving 0.26 grams of adipic acid in 2.98 grams of concentrated aqueous ammonium hydroxide solution followed by addition of 0.05 grams of ammonium carbonate. In this embodiment, the molar ratio of the carboxylic acid functional groups to ammonia (from ammonium hydroxide) is approximately 1:1 in the resulting solution. The resulting solution was then added with rapid stirring to 2.27 grams of Bacote 20 crosslinking agent to form Solution A. Bacote 20 is ammonium zirconium carbonate and sold in commerce by MEL Chemicals. In another embodiment, the Bacote 20 is replaced with a molar equivalent amount of zinc ammonium carbonate.

3. Preparation of Solution B

The steps for preparing Solution B include adding 0.01 grams of Tinolux BMC into 1.07 grams of distilled water containing 0.04 grams of ammonium carbonate. Tinolux BMC is zinc phthalocyanine tetrasulfonate, a photocatalyst, sold in commerce by BASF.

4. Preparation of Coating Solution

An intermediate solution is formed by adding Solution A dropwise to Solution B accompanied by rapid stirring. The intermediate solution has an approximately 1:1 molar ratio between the carboxylate functional groups (from the adipic acid) to zirconium (from the Bacote 20). The coating solution is prepared by adding one drop of Q2-5211 to the Solution A/Solution B mixture.

5. Formation of Coating

The coating solution is deposited onto samples of Kappler Provent 10,000 spun-bond protective polyolefin fabric. The coated samples are dried for 2 hours within a convection oven at 80° Celsius and subsequently cooled to room temperature. Drying eliminates water, ammonia and carbon dioxide from the coating and facilitates condensation between the adipic acid monomer carboxylate groups and the hydrous zirconium hydroxide forming an interconnected polymeric network containing Tinolux BMC (the zinc phthalocyanine tetrasulfonate photocatalyst).

6. Coating Solubility Testing and Performance

The coated samples were immersed in distilled water for 4 hours to verify that the Tinolux photocatalyst was secured on, and in, the coating. Tinolux is highly soluble in water. The immersion solution did not become discolored during this time period. Given the fact that Tinolux has a high spectral absorption-coefficient (i.e., a solution color change will occur with the addition of very small amounts of Tinolux), the fact that no discoloration occurred in the immersion solution indicates that Tinolux did not leach from the coated samples.

B. Example 3

Another example of Applicants' coating using potassium carbonate and Zirmel 1000 crosslinking agent is prepared using the chemicals in the quantities provided in Table 10. The steps to create Applicants' coating include creating two solutions, Solution C and Solution D, combining the two solutions to form a coating solution, applying the coating solution to a surface, and applying heat to the surface to drive off volatile components from the coating solution to form a coating.

TABLE 10

| Solution | Component | Function | Quantity (grams) | Quantity (wgt. %) |
|---|---|---|---|---|
| A | Adipic Acid | Monomer | 0.29 | 4.6 |
| A | Distilled Water | Coating Vehicle | 2.82 | 55.3(total) |
| A | Potassium Carbonate | pH Buffer | 0.09 | 1.4 |
| B | Tinolux BMC | Photocatalyst | 0.02 | 0.3 |
| B | Distilled Water | Coating Vehicle | 0.68 | 55.3(total) |
|  | Zirmel 1000 (20 wgt. % $ZrO_2$ solid basis) | Crosslinking Agent | 2.43 | 38.4 |

1. Preparation of Solution C

The steps for preparing Solution C include dissolving 0.29 grams of adipic acid in 2.82 grams of distilled water followed by 0.09 grams of potassium carbonate. The potassium carbonate promotes adipic acid neutralization and solubilization.

2. Preparation of Solution D

The steps for preparing Solution D include adding 0.02 grams of Tinolux BMC to 0.68 grams of distilled water. Tinolux BMC is a zinc phthalocyanine tetrasulfonate photocatalyst that is sold in commerce by BASF.

3. Preparation of Coating Solution

A solution is formed by adding Solution D to Solution C followed by the addition of 2.43 grams of Zirmel 1000 to form the coating solution. Zirmel 1000 is potassium zirconyl carbonate and is sold in commerce by MEI Chemicals.

4. Formation of Coating

The coating solution is depositing onto samples of Kappler Provent 10,000 spun-bond protective polyolefin fabric. The sample was not pretreated with a urethane pre-coat. The coated samples are dried for 2 hours within a convection oven at 80° Celsius and subsequently cooled to room temperature.

5. Surface Reactivity Test Results

The sample was exposed to 5 μL of 98% chloroethyl ethyl sulfide (CEES), which is sold in commerce by Sigma-Aldrich. CEES is a mustard gas analogue, commonly used to test the efficacy of compositions in decomposing CBAs. The coated sample was irradiated at an intensity of about 100,000 lux for 30 minutes. The sample was then exposed to a solvent, acetone, to dissolve any soluble substances on the sample. The solution of acetone containing any dissolved substances was extracted.

Figure 14:
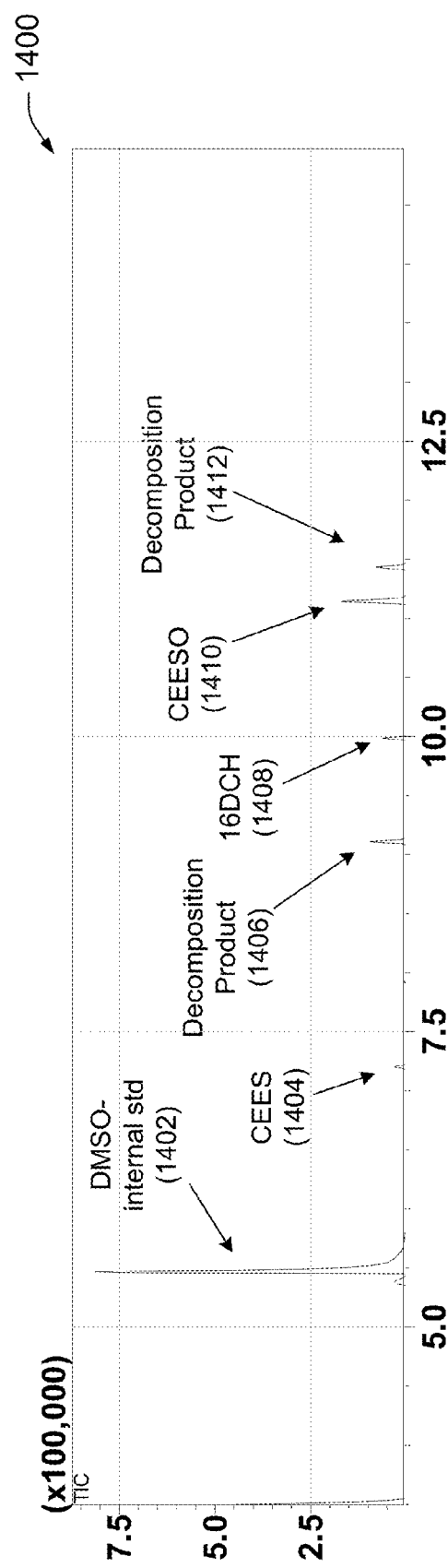
FIG. 14 is a gas chromatography-mass spectrometry chromatogram of one embodiment of Applicants' dicarboxylic acid water-based coating formulation.

Referring to FIG. 14(a), a GC Chromatogram 1400 of the solution mixture extracted by acetone from the irradiated sample, which was treated with the coating formulation described in Table 10, is depicted.

Peaks in the GC Chromatogram 1400 represent components present in the acetone solution. The area under each peak represents the amount of the component present in the solution. Peak 1402 represents dimethyl sulfoxide, which is an internal standard used to adjust the measurement peaks based on a known quantity. Peak 1408 represents 1,6-dichlorohexane, an impurity present in the commercial CEES product. Peaks 1406 and 1412 are additional products from the decomposition of CEES.

A large CEESO peak 1410 indicates that the majority of the CEES present has been oxidized. A small amount of remaining CEES was present in the solution as indicated by the CEES peak 1404.

III. Flame Retardant, Enhanced Performance Alcohol-Based Coating Formulation

Applicant has developed compositions that decrease flammability and increase the production of singlet oxygen when used in combinations with the aluminum alkoxide and dicarboxylic acid coatings described above. Halogenated compounds have been shown to prolong the excited triplet state lifetime of photosensitizers through heavy atom effects, which result in an increase in the singlet oxygen generation by the photosensitizers. Applicant has determined that the reactivity rate of the coating with respect to CEES degradation roughly doubles when the halogenated composition described in this section is added to the metal alkoxide/polyfunctional alcohol based coatings described in Section 1. In one embodiment, the halogenated compound used in Applicants' composition contains bromine. In one embodiment, the halogenated compound used in Applicants' composition contains iodine. In one embodiment, the halogenated compound used in Applicants' composition contains fluorine. In one embodiment, the halogenated compound used in Applicants' composition contains chlorine.

In one embodiment, Applicants' halogenated composition is added to the photocatalyst/metal alkoxide/polyfunctional alcohol coating solution before the coating solution is applied to the surface. In one embodiment, Applicants' halogenated composition is added as a pre-treatment layer to the surface before a second layer of the photocatalyst/metal alkoxide/polyfunctional alcohol based coated is applied.

Referring to FIG. 2(a), the creation of one embodiment of Applicants' halogenated composition is depicted. Tetrabromophthalic anhydride 200 is reacted with diglycolamine 202. Tetrabromophthalic anhydride (CAS.; 632-79-1) is sold in commerce by Albemarle Corporation and has known flame retardant properties. The molecular structure of tetrabromophthalic anhydride is modified to produce a derivative compatible with the various coatings described herein. Diglycolamine (CAS.; 929-06-6) is sold in commerce by Huntsman International LLC. An example formulation of Applicants' composition is prepared according to Table 11 below.

TABLE 11

| Reference Number in FIG. 2(a) | Component | Quantity (grams/mmols) |
|---|---|---|
| 200 | Tetrabromophthalic Anhydride | 50/107.8 |
| 202 | Diglycolamine | 11.34/107.8 |
|  | Ethanol | 34/ |

The tetrabromophthalic Anhydride 200 is reacted with diglycolamine 202 in refluxing ethanol environment. The result is an amide derivative 206 with an alcohol end cap. The amide derivative 206 is soluble in hot ethanol, but solidifies upon cooling to form a paste-like mixture. This mixture contains the amide product at approximately 1.1 mmol per gram of mixture and ethanol at approximately 35.7% w/w. This amide derivative is compatible with the metal alkoxide/polyfunctional alcohol and dicarboxylic acid/metal carbonate coatings described herein, likely due to a co-condensate formed between the amide derivative and the metal alkoxide or metal carboxylate.

Referring to FIG. 2(b), in one embodiment, the cooled amide derivative 206 mixture from FIG. 2(a) is further reacted to form a water soluble product. The mixture from FIG. 2(a) contains the amide derivative 206 and ethanol. The components provided in Table 12 are added to the mixture.

TABLE 12

| Reference Number in FIG. 2(b) | Component | Quantity |
|---|---|---|
|  | Tetrabromophthalic Anhydride/Diglycolamine/Ethanol Mixture | 5.0 grams |
| 212 | Aminopropyltriethoxysilane | 1.2 grams |
|  | Ammonium Hydroxide Solution (5% v/v) | 15-20 ml |

To prepare the halogenated coating solution, an equivalent amount of aminopropyltriethoxysilane 212 is added to the tetrabromophthalic anhydride/diglycolamine/Ethanol mixture at approximately 80-100° C. Aminopropyltriethoxysilane (CAS.; 919-30-2) is sold in commerce as Silquest A-1100 by Momentive Performance Materials. An ammonium hydroxide solution is slowly added to the resulting mixture under vigorous stirring. The result is a salt 216 formed from the amine derivative 206 and the aminopropyltriethoxysilane 212.

After standing at room temperature for two hours, the resulting mixture was applied directly to a sample of Kappler ProVent 10,000 fabric. The sample was dried in a convection oven for 20 minutes at 80° C. In one embodiment, the metal alkoxide/polyfunctional alcohol/photocatalyst coating is applied over the halogenated coating with no loss of adhesion. In one embodiment, the dicarboxylic acid/metal carbonate/photocatalyst coating is applied over the halogenated coating with no loss of adhesion.

Figure 3:
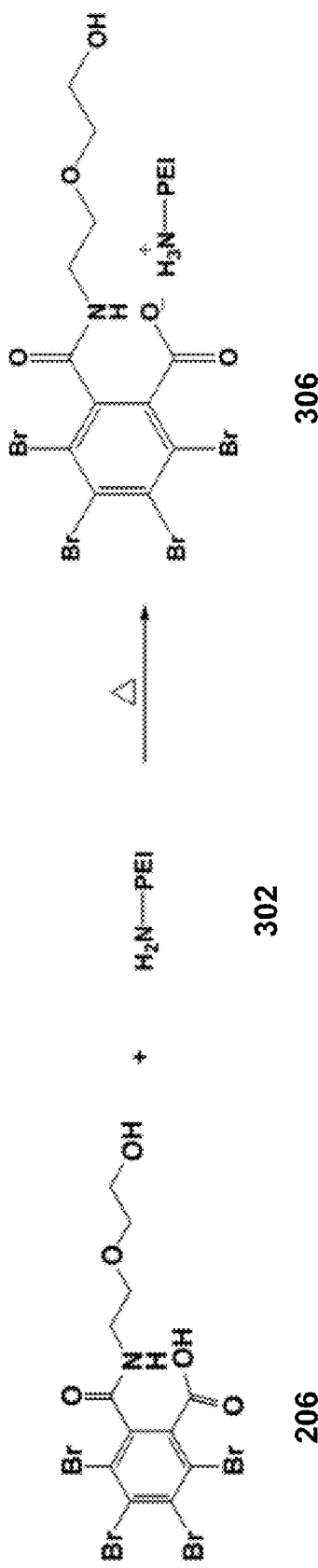
FIG. 3 shows additional chemical reactions involved in producing Applicants' alcohol-based flame retardant coating formulation.

Referring to FIG. 3, in another embodiment, the cooled amide derivative 206 mixture from FIG. 2(a) is further reacted to form a water soluble product. The mixture from FIG. 2(a) contains the amide derivative 206 and ethanol. The components provided in Table 13 are added to the mixture.

TABLE 13

| Reference Number in FIG. 2(b) | Component | Quantity (grams) |
|---|---|---|
|  | Tetrabromophthalic Anhydride/Diglycolamine/Ethanol Mixture | 2.40 |
| 302 | Polyethyleneimine | 1.20 |
|  | Ethanol | 0.50 |
|  | Water | 8.62 |

To prepare the halogenated coating solution, the polyethyleneimine 302 is mixed with ethanol. The polyethyleneimine/ethanol solution is reacted with the tetrabromophthalic anhydride/diglycolamine/ethanol mixture with a brief heat exposure of about 70-80° C. The resultant product is a slight yellow clear solution containing a salt 306 formed by the amine derivative 206 and the polyethyleneimine 302. In one embodiment, any weight loss due to heating is readjusted with additional ethanol.

After allowing the solution to cool to room temperature, water is slowly added under vigorous stirring. The resulting mixture will maintain a clear homogeneous state after addition of water at approximately 7 grams but will form an emulsion with the addition of water above this amount. A constant agitation is required to maintain the emulsion until the coating is applied to a surface. In one embodiment, the metal alkoxide/polyfunctional alcohol/photocatalyst coating is applied over the halogenated coating with no loss of adhesion. In one embodiment, the dicarboxylic acid/metal carbonate/photocatalyst coating is applied over the halogenated coating with no loss of adhesion.

The resulting brominated compositions 206, 216, and 306, are compatible with the metal alkoxide/polyfunctional alcohol/photocatalyst and the dicarboxylic acid/metal carboxylate/photocatalyst coatings because of the exchange of hydroxyl groups between the brominated compositions 206, 216, and 306 and the metal alkoxide or the metal carboxylate. Additional Examples 4-10 summarize the preparation of additional brominated compositions. Examples 4-10 are presented to further illustrate to persons skilled in the art how to make and use the invention. These examples are not intended as a limitation, however, upon the scope of the invention, which is defined by the scope of the claims appended hereto.

A. Example 4

Tetrabromophthalic Anhydride (TBPA)/Monoisopropanolamine (MIPA) Adduct (032811LH-6)

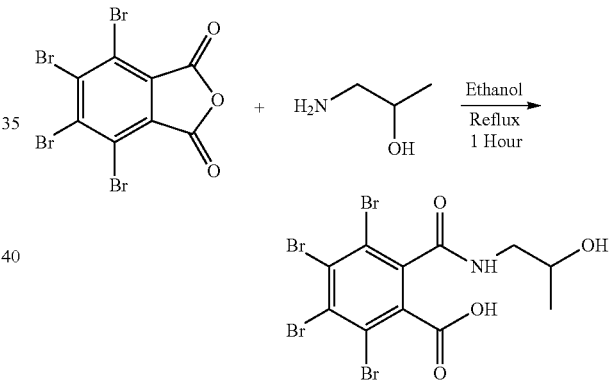

Reaction of TBPA with MIPA gives an TBPA/MIPA adduct. TBPA is sold in commerce by Albermarle as Saytex® RB-49. MIPA is sold in commerce by Dow Chemical. 44.8 mmol of TBPA is added to a round bottom flask with 50.74 grams of ethanol. The mixture is heated to reflux after which 44.8 mmol of MIPA is added dropwise and the solution refluxed for 1 hour. The ethanol is removed using a rotary evaporator to produce a yellow crystalline solid.

Figure 4:
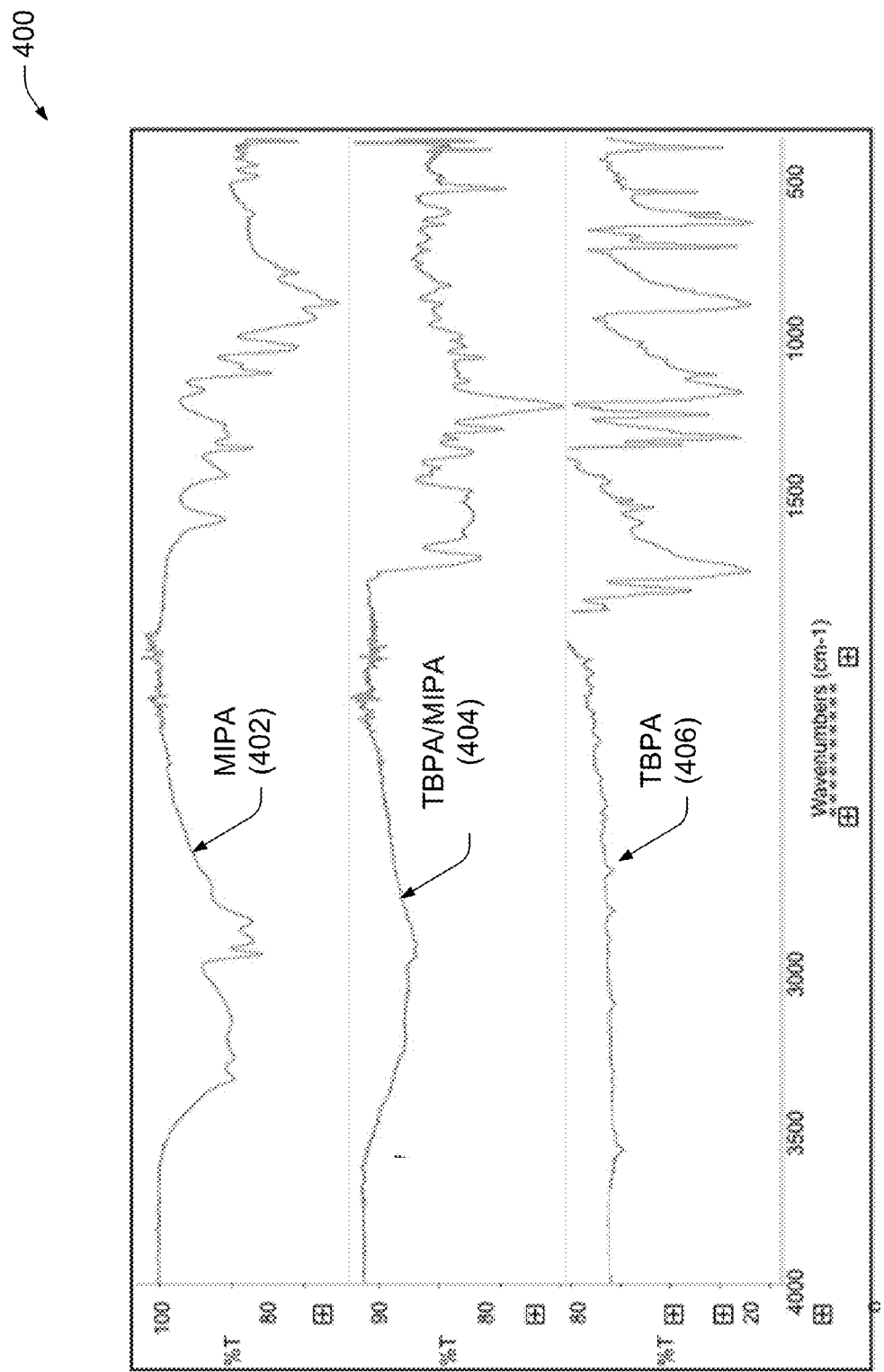
FIGS. 4-10 are IR spectra of various embodiments of Applicants' alcohol-based flame retardant coating formulation.

Referring to FIG. 4, an IR comparison 400 of TBPA, MIPA, and the TBPA/MIPA adduct is depicted. Line 402 shows the IR spectrum of MIPA, line 404 shows the IR spectrum of the TBPA/MIPA adduct, and line 406 shows the IR spectrum of TBPA. The TBPA line 406 shows the disappearance of the TBPA asymmetrical and symmetrical C=O stretching bands at 1821 and 1760 cm-1. The TBPA/MIPA line 404 shows numerous amide bands, which indicate the formation of the TBPA/MIPA amine adduct. The TBPA/MIPA line 404 shows the amide I and II, C=O stretching and N—H bending vibrations respectfully, bands overlap in the region of 1660-1620 cm-1. The amide C—N Stretch band is more apparent at 1384 cm-1 in line 404. An indication of product formation is the carboxylic acid C—O stretching band at 1240 cm-1 can also been seen in line 404.

B. Example 5

TBPA/Aminoethylethanolamine (AEEA) Adduct (032811LH-5)

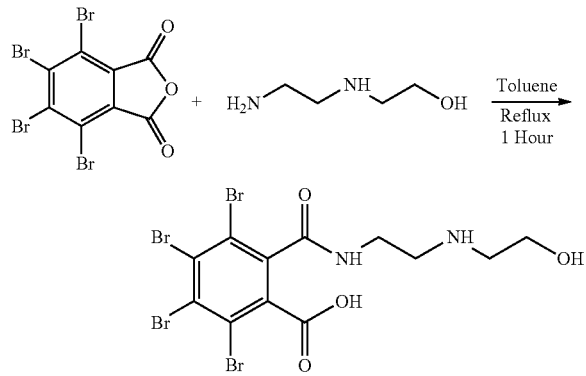

Reaction of TBPA with AEEA gives an TBPA/AEEA adduct. AEEA is sold in commerce by Dow Chemical. 43.6 mmol of TBPA was added to a round bottom flask with 51.00 grams of pure toluene. The mixture is heated to reflux after which 43.6 mmol of AEEA was added dropwise and the solution refluxed for one hour. The toluene is removed using a rotary evaporator to produce a yellow solid.

Figure 5:
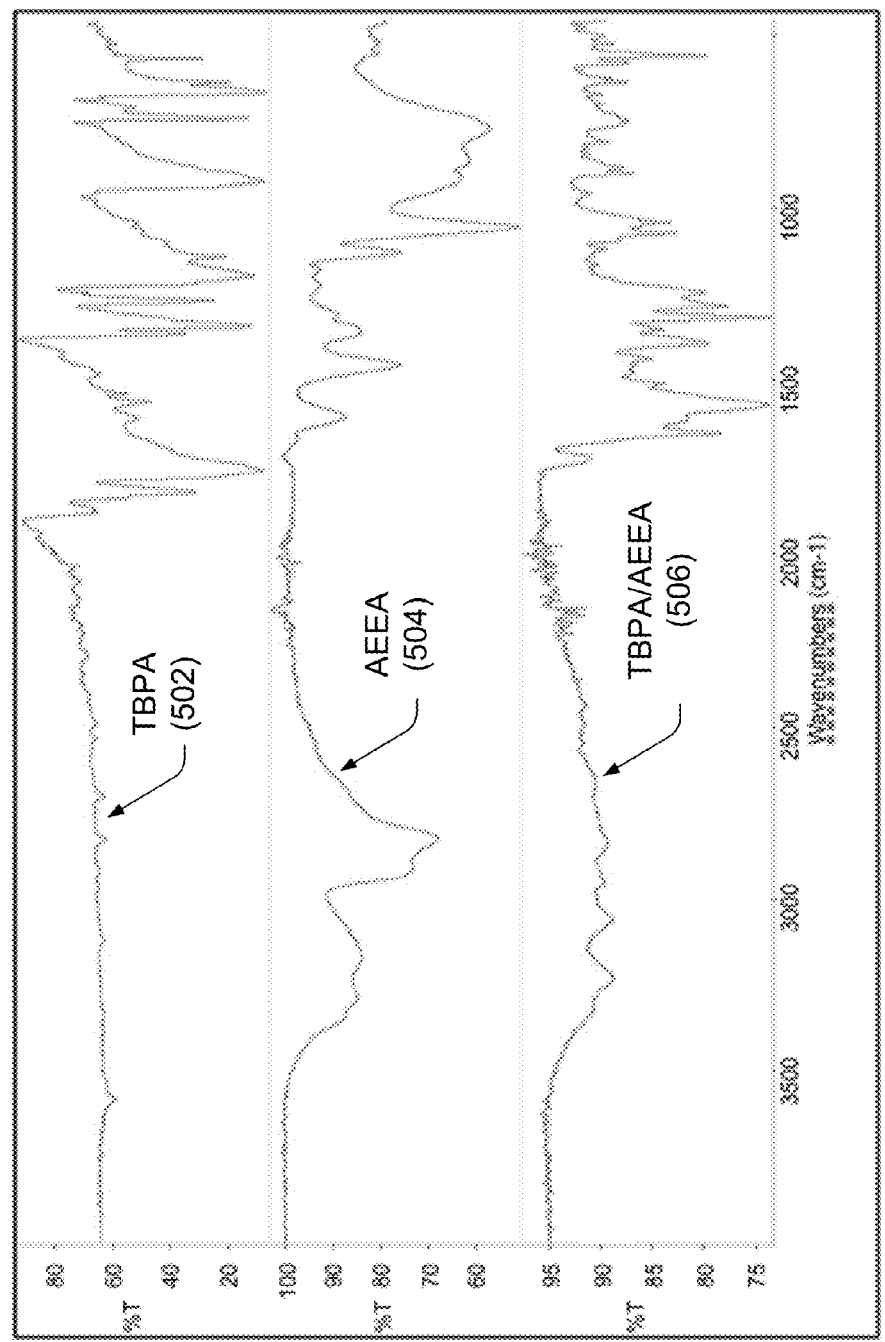

Referring to FIG. 5, an IR comparison 500 of TBPA, AEEA, and the TBPA/AEEA adduct is depicted. Line 502 shows the IR spectrum of AEEA, line 504 shows the IR spectrum of the AEEA, and line 506 shows the IR spectrum of the TBPA/AEEA adduct. Line 502 shows the TBPA asymmetrical and symmetrical C═O stretching bands at 1821 and 1760 cm-1, which are not present in the product (line 506) indicating that the ring has been opened. Ring opening and product formation is also indicated by the amide and carboxylic acid bands in TBPA/AEEA line 506. The TBPA/AEEA line 506 also shows the amide I band, C═O stretching, at 1650 cm-1, the amide C—N stretch band at 1389 and the carboxylic acid C—O stretching band at 1244 cm-1.

C. Example 6

TBPA/Diisopropanolamine (DIPA) Adduct (032811LH-4)

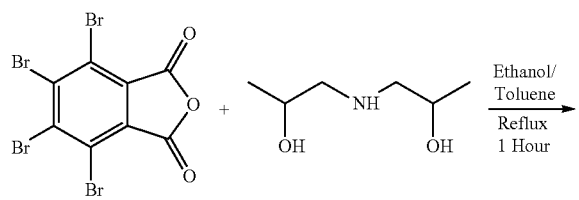

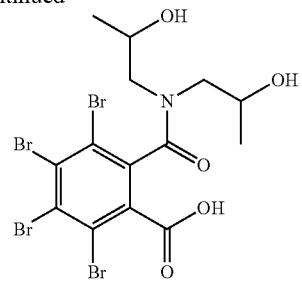

Reaction of TBPA with DIPA gives an TBPA/DIPA adduct. DIPA is sold in commerce by Dow Chemical. 47.5 mmol of TBPA was added to a round bottom flask with 50.96 grams of toluene and 43.07 grams of ethanol. The mixture is heated to reflux after which 47.5 mmol of DIPA, dissolved in 14.03 grams of ethanol, is added dropwise. The solution is refluxed for 1 hour. The solvent is removed using a rotary evaporator to produce a white solid.

Figure 6:
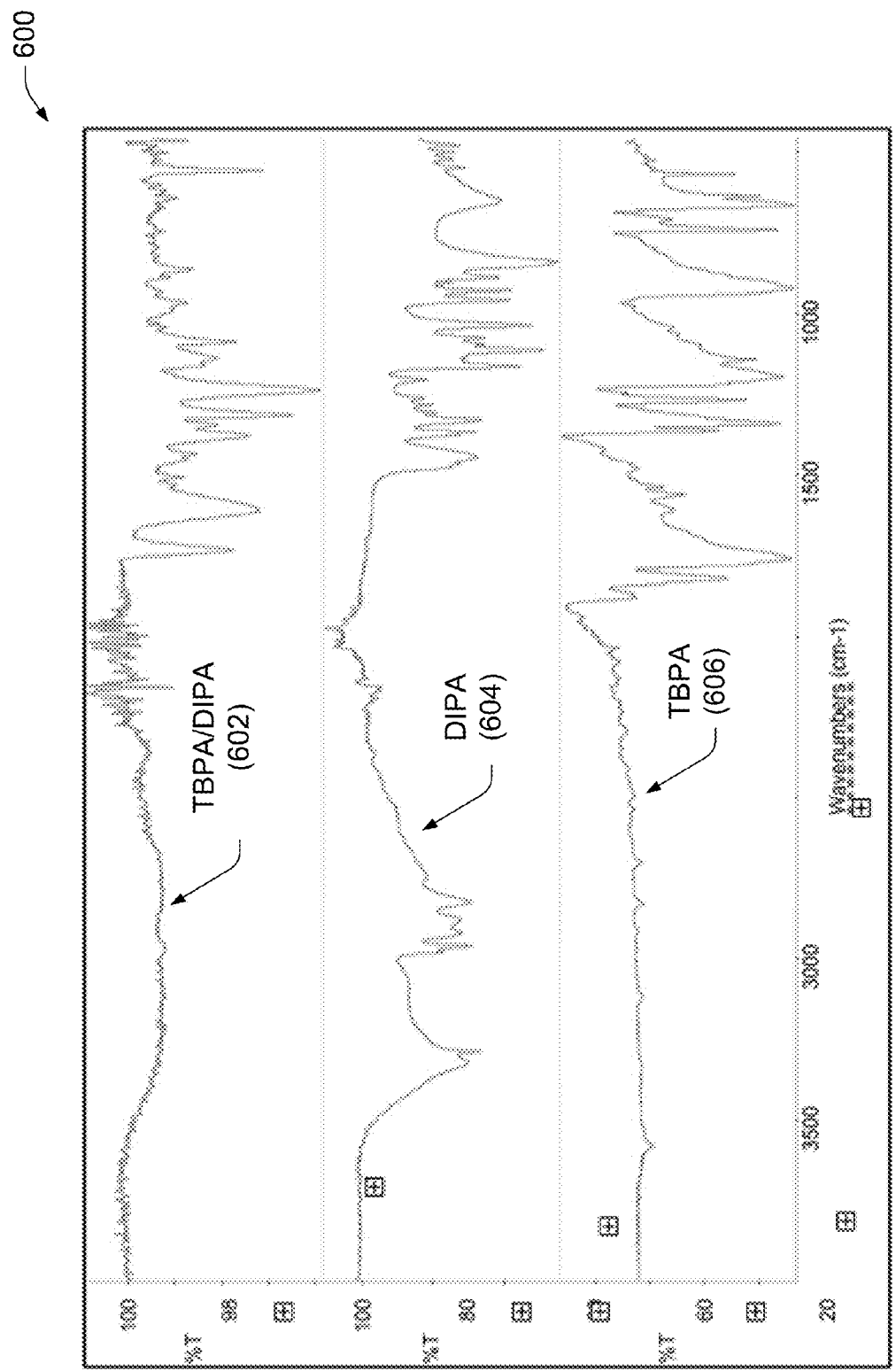

Referring to FIG. 6, an IR comparison 600 of TBPA, DIPA, and the TBPA/DIPA adduct is depicted. Line 602 shows the IR spectrum of the TBPA/DIPA adduct, line 604 shows the IR spectrum of DIPA, and line 506 shows the IR spectrum of TBPA. TBPA line 606 shows the anhydride asymmetrical and symmetrical C═O stretching bands at 1821 and 1760 cm-1, which are not present in the TBPA/DIPA adduct product (line 602) and indicates that the ring has been opened. TBPA/DIPA line 602 shows a band at 1609 cm-1 that may be the amide I band. Further indication of ring opening is given by the carboxylic acid C—O stretching band at 1237 cm-1 in the TBPA/DIPA line 602.

D. Example 7

TBPA/XTJ-506 Adduct (032811LH-1)

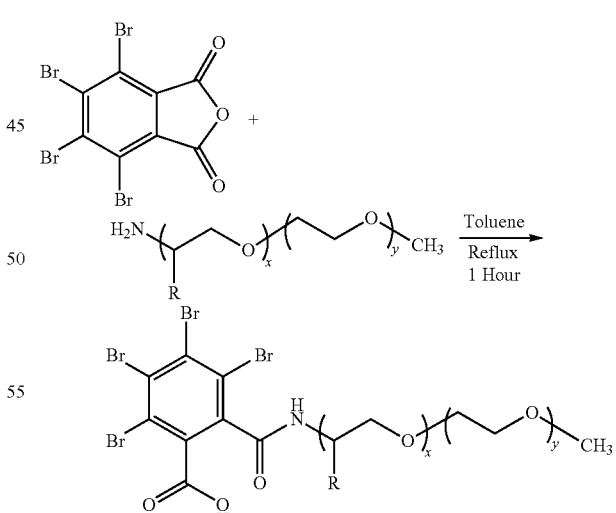

R = H for ethylene oxide (EO), or CH$_3$ for propylene oxide (PO)
PO/EO mol ratio = 3/19
Approximate MW = 1,000 g/mol Reaction of TBPA with XJT-506 gives an TBPA/XTJ-506 adduct. XJT-506 is a monoetheramine with a molecular weight of about 1000 g/mol and is sold in commerce by Huntsman. 58.9 mmol of TBPA was combined with 58.9 mmol of XTJ-506 in 62.41 g of pure toluene. The mixture is heated at reflux for 1 hour. The toluene is then removed using a rotary evaporator to produce a brown-red oily substance.

Figure 7:
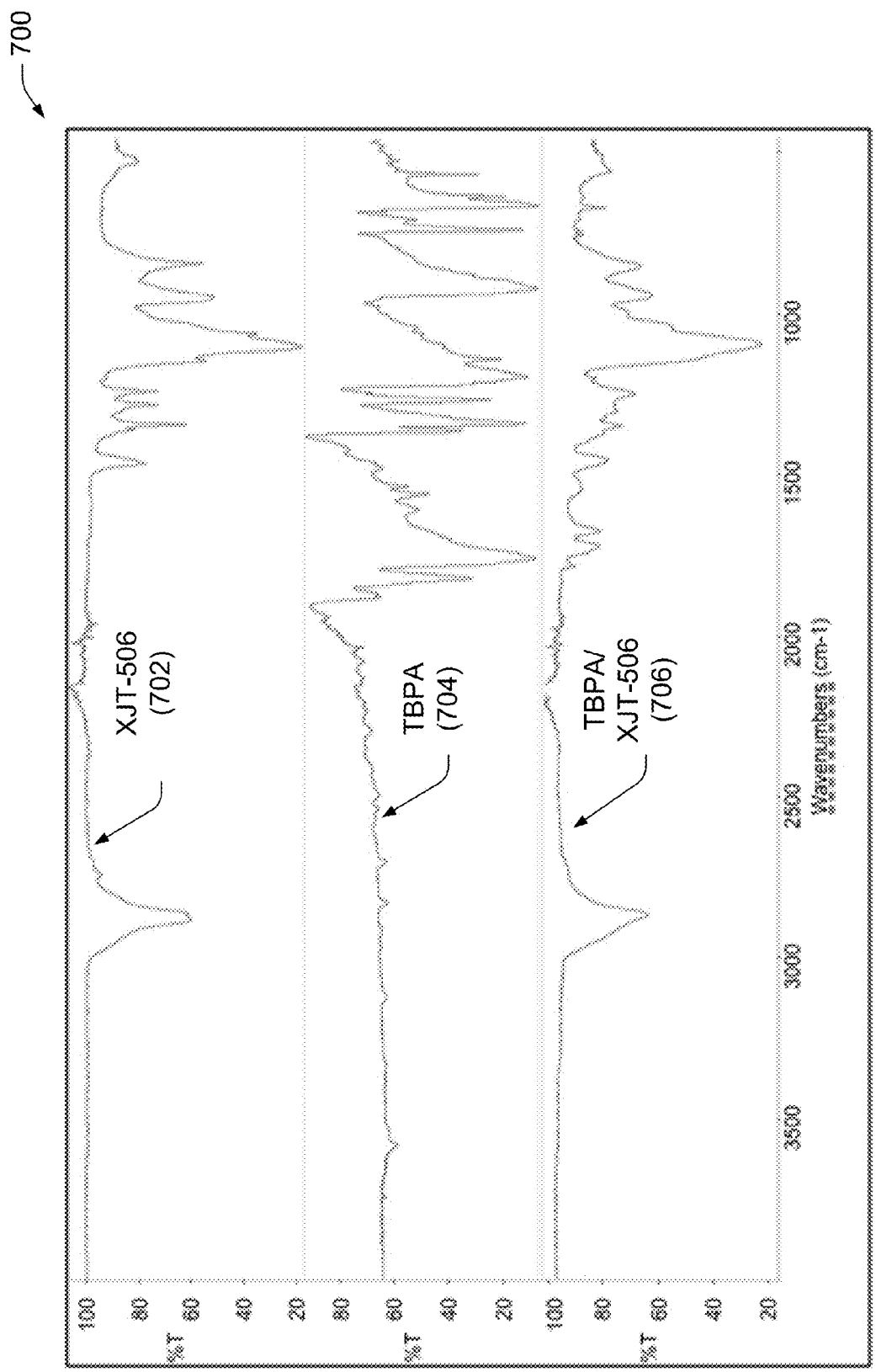

Referring to FIG. 7, an IR comparison 700 of TBPA, XTJ-506, and the TBPA/XTJ-506 adduct is depicted. Line 702 shows the IR spectrum of XTJ-506, line 704 shows the IR spectrum of the TBPA, and line 706 shows the IR spectrum of the TBPA/XTJ-506 adduct. TBPA line 704 shows asymmetrical and symmetrical C=O stretching bands at 1821 and 1760 cm-1, which are not present in the TBPA/XJT-506 product (line 706) and indicates that the ring has been opened. TBPA/XJT-506 line 706 also indicates that the amide has been formed with the amide I C=O stretch band at 1673 cm-1 and the N—H bending band at 1546 cm-1. The carboxylic acid C—O stretch band at 1248 cm-1 can be seen in the TBPA/XJT-506 line 706.

E. Example 8

TBPA/XTJ-504 Adduct (032811LH-3)

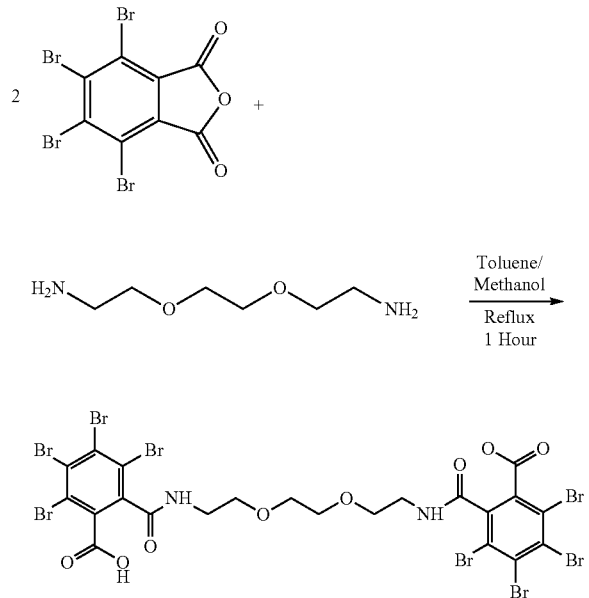

Reaction of TBPA with XJT-504 gives an TBPA/XTJ-504 adduct. XJT-504 is a polyether diamine with a molecular weight of about 148 g/mol and is sold in commerce by Huntsman. 33.3 mmol of TBPA was combined with 16.65 mmol of XTJ-504 in 32.02 g of pure toluene and 50 g of methanol. The solution is heated to reflux for 1 hour. The solvents were removed using a rotary evaporator to produce a yellow solid.

Figure 8:
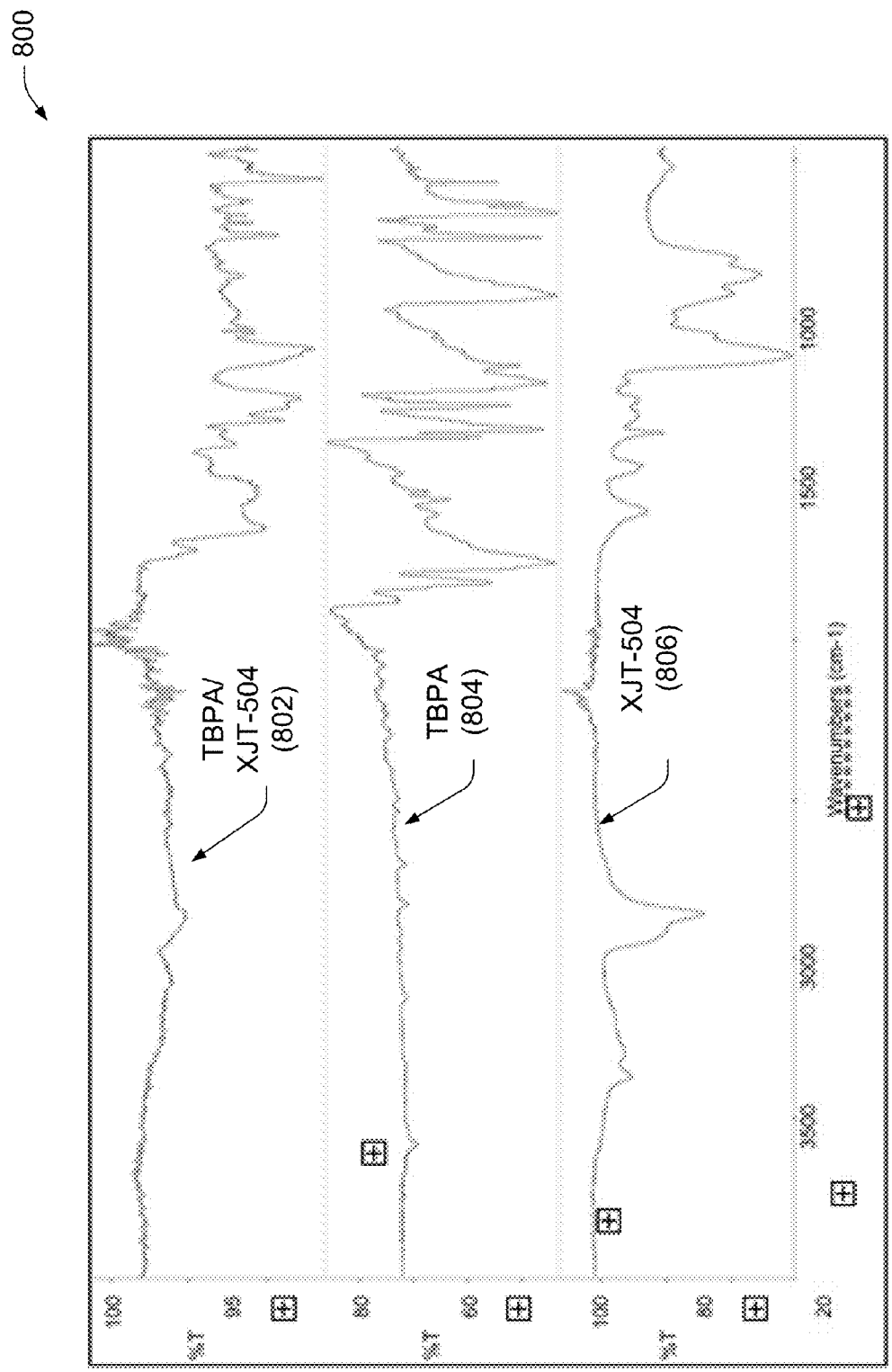

Referring to FIG. 8, an IR comparison 800 of TBPA, XTJ-504, and the TBPA/XTJ-504 adduct is depicted. Line 802 shows the IR spectrum of the TBPA/XTJ-504 adduct, line 804 shows the IR spectrum of the TBPA, and line 806 shows the IR spectrum of XTJ-504. TBPA line 804 shows asymmetrical and symmetrical C=O stretching bands at 1821 and 1760 cm-1, which are not present in the TBPA/XTJ-504 product (line 802) and indicates that the ring has been opened. The TBPA/XJT-504 line 802 shows the amide I band, C=O stretching, at 1651 cm-1, the amide II band, N—H bending, at 1524 cm-1 and the carboxylic acid C—O stretch band at 1243 cm-1, indicating the ring opening of the anhydride and formation of the amide adduct.

F. Example 9

TBPA/2-amino-2-methyl-1,3-propanediol (AMPD) Adduct (032611LH-2)

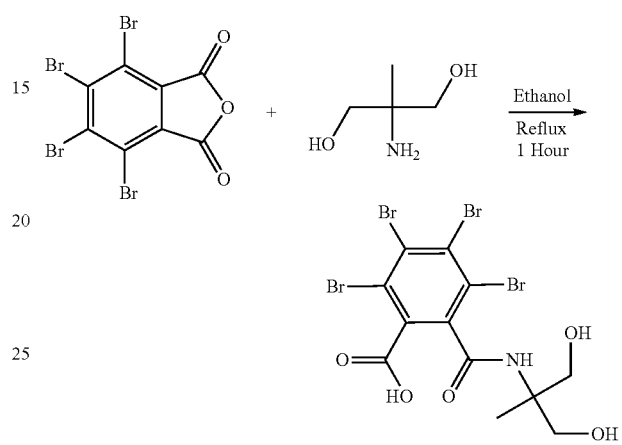

Reaction of TBPA with AMPD gives an TBPA/AMPD adduct. AMPD is sold in commerce by Angus. 37.2 mmol of TBPA was combined with 37.2 mmol of AMPD in 164.5 g of pure ethanol. The mixture is refluxed for 2 hours. The solvent was removed using a rotary evaporator to produce a white solid.

Figure 9:
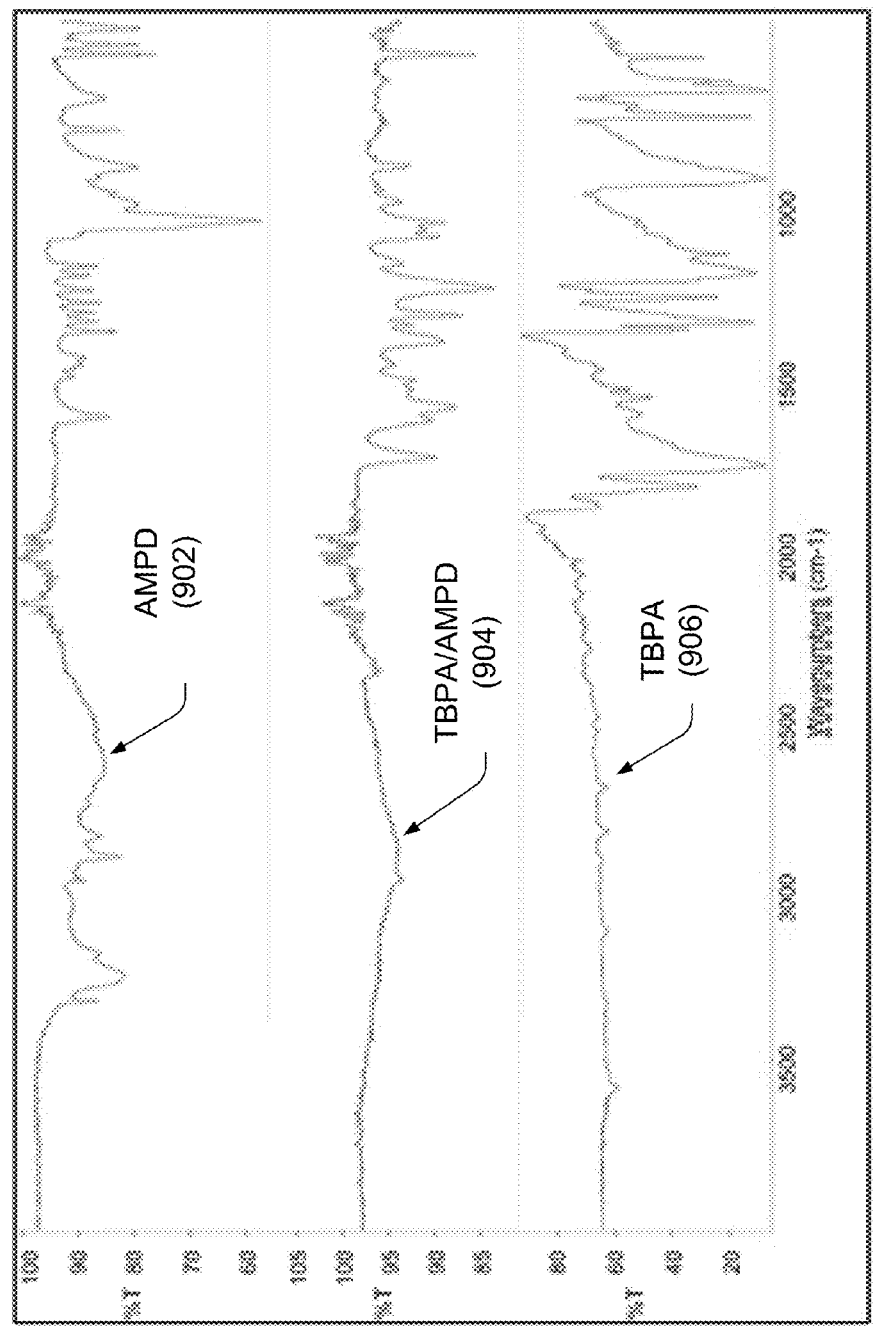

Referring to FIG. 9, an IR comparison 900 of TBPA, AMPD, and the TBPA/AMPD adduct is depicted. Line 902 shows the IR spectrum of AMPD, line 904 shows the IR spectrum of the TBPA/AMPD adduct, and line 906 shows the IR spectrum of TBPA. TBPA line 906 shows asymmetrical and symmetrical C=O stretching bands at 1821 and 1760 cm-1, which are not present in the TBPA/AMPD product (line 904) and indicates that the ring has been opened. The TBPA/AMPD line 904 shows the amide I band, C=O stretching, at 1626 cm-1, the amide II band, N—H bending, at 1586 cm-1 and the carboxylic acid C—O stretch band at 1241 cm-1. AMPD line 902 shows the primary amine, N—H bending, band at 1616 cm-1, which is not present in the TBPA/AMPD product (line 904), indicating the anhydride ring opening of the amide adduct.

G. Example 10

PA (phthalic anhydride)/AMPD Adduct (032611LH-1)

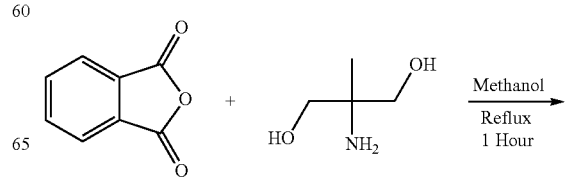

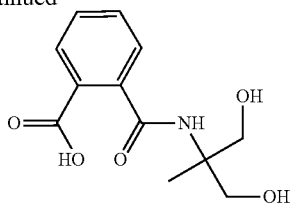

Reaction of phthalic anhydride (PA) with AMPD gives an PA/AMPD adduct. PA is sold in commerce by Stepan. 75.9 mmol of PA was combined with 75.9 mmol of AMPD in 26.19 g of methanol and heated at reflux for 2 hours. The methanol was stripped off with a rotary evaporator to produce a clear solid.

Figure 10:
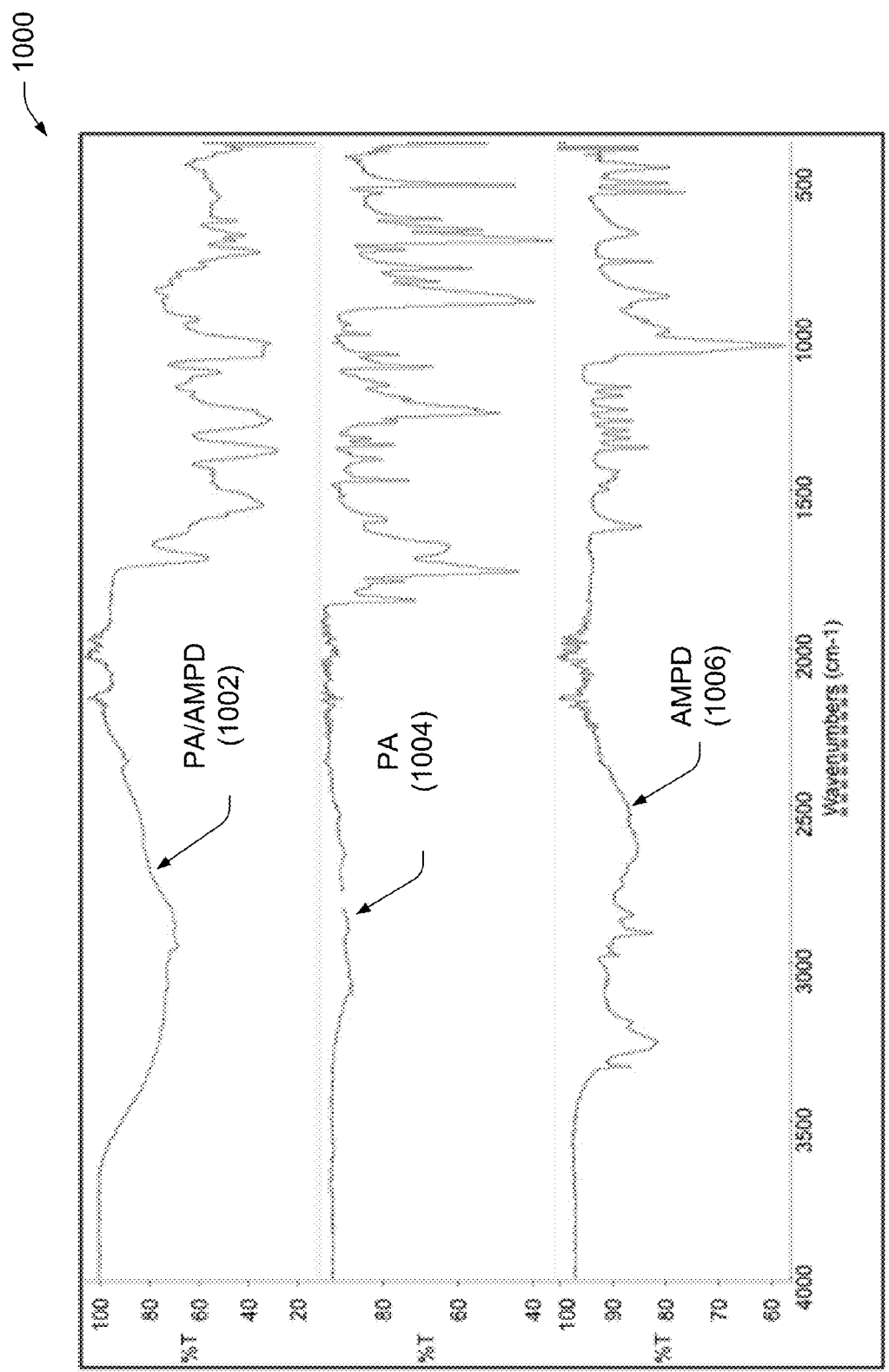

Referring to FIG. 10, an IR comparison 1000 of PA, AMPD, and the PA/AMPD adduct is depicted. Line 1002 shows the IR spectrum of the PA/AMPD adduct, line 1004 shows the IR spectrum of PA, and line 1006 shows the IR spectrum of AMPD. The PA line 1004 shows asymmetrical and symmetrical C=O stretching bands at 1850 and 1790 cm-1 (FIG. 7b), which are not present in the PA/AMPD product (line 1002) and indicates that the ring has been opened. Further indication of ring opening and formation of the adduct is apparent due to the presence of the carboxylic acid C—O stretching band at 1277 cm-1 in PA/AMPD line 1002.

H. Solubility Testing

The solubility of the adducts in Examples 4-10 were examined in concentrated ammonium hydroxide water (28-30% NH$_4$OH), isopropanol, toluene and water. The solubility of the adducts in water was tested at an undefined minimal concentration and the rest of the solvents were tested with the adduct at 10% by weight. The adducts were retested at 0.02% if the solvent dispersed the adduct well, but did not dissolve it completely. The results are summarized in Table 14 below.

TABLE 14

Solubility of adducts in aqueous ammonium hydroxide (28-30% NH$_4$OH), isopropanol and toluene at 10% by weight of adduct. Also water at a minimal undefined concentration.

| Adduct ID | Water | Ammonium Hydroxide Water (28-30% NH$_4$OH) | Isopropanol | Toluene |
| --- | --- | --- | --- | --- |
| TBPA/MIPA (032811LH-6) | No, oily | No, oily | No, oily* | No, oily |
| TBPA/AEEA (032811LH-5) | No | No* | No | No |
| TBPA/DIPA (032811LH-4) | Yes | Yes | Yes | No |
| TBPA/XTJ-506 (032811LH-1) | No | Yes | Yes | Yes |
| TBPA/XTJ-504 (032811LH-3) | No | No | No | No |
| TBPA/AMPD (032611LH-2) | No | Yes | No | No |
| PA/AMPD (032611LH-1) | Yes | Yes | Yes | No |

*Soluble at 0.02% by weight.

Aqueous ammonium hydroxide was generally the best solvent followed by isopropanol. Adducts which were successfully dissolved in solvents (with the exception of pure water) were used to perform simple solubility tests with aluminum phthalocyanine chloride (AlPc-Cl). Results are presented in Table 15 along with the percent weight of AlPc-Cl.

TABLE 15

Solubility of aluminum phthalocyanine chloride (AlPc-Cl) in adduct/solvent (0.1% adduct by weight, from Table 1). Minimum concentration tested is reported in brackets as percent weight AlPc-Cl in adduct/solvent.

| Adduct ID | Ammonium Hydroxide Water (28-30% NH$_4$OH) | Isopropanol | Toluene |
| --- | --- | --- | --- |
| TBPA/DIPA (032811LH-4) | No [0.10%] | No [0.10%] | — |
| TBPA/XTJ-506 (032811LH-1) | No [0.10%] | No [0.10%] | No [0.10%] |
| TBPA/XTJ-504 (032811LH-3) | No [0.12%] | — | — |
| TBPA/AMPD (032611LH-2) | No [0.16%] | — | — |
| PA/AMPD (032611LH-1) | No [0.10%] | No [0.10%] | — |

I. Example 11

Figure 12:
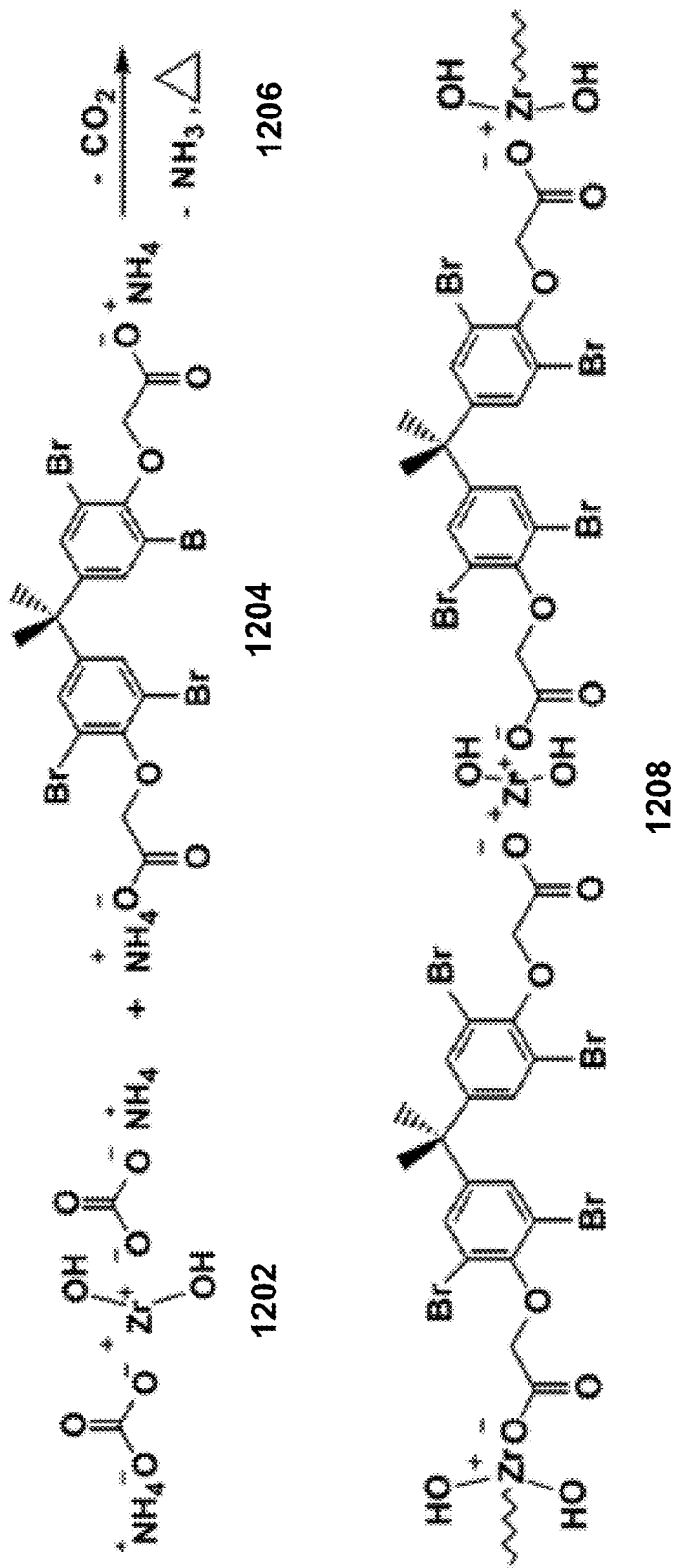

FIGS. 11(a), 11(b), and 12 depict the steps for creating a brominated bisphenol A additive, or pre-coat, for Applicants' photocatalyst-containing coating compositions described herein.

Referring to FIGS. 11(a) and 11(b), two embodiments for creating a precursor to Applicants' halogenated coating composition are depicted. Turning to FIG. 11(a), brominated bisphenol A 1102 is combined with methyl 2-chloroacetate 1104 and potassium carbonate in acetone 1108. The hydroxyl groups on the brominated bisphenol A 1102 react with the chloro group of methyl 2-chloroacetate 1104 via a base catalyzed nucleophilic displacement reaction 1110. Ammonium hydroxide 1112 is added to the solution to hydrolyze the methyl ester groups and form the ammonium salt of carboxymethylated brominated bisphenol A 1106.

Turning to FIG. 11(b), brominated bisphenol A 1122 is combined with sodium chloroacetate 1124 and potassium carbonate in water 1128. A photocatalyst is also added to the solution. In one embodiment, the photocatalyst is Tinolux BMC. In various embodiments, the photocatalyst is one described herein or a combination thereof. The hydroxyl groups on the brominated bisphenol A 1102 react with the chloro groups of the sodium chloroacetate 1124 via a base catalyzed nucleophilic displacement reaction 1130. Ammonium hydroxide 1132 is added to the solution to form the ammonium salt of bisphenol A 1106.

Referring to FIG. 12, the brominated bisphenol A ammonium salt 1204 formed in FIG. 11(a) or 11(b) is combined with a solution of hydrous ammonium zirconium carbonate 1202. The resulting solution is heated to drive off the carbon dioxide (CO$_2$) and ammonia (NH$_3$) as depicted at 1206. The ammonium on the brominated bisphenol A is displaced by hydrous zirconium hydroxide to form a long chain condensation polymer. The resulting coating, after drying, is a polymeric network enmeshing the photocatalyst.

IV. Polyfunction Alcohol Water-Based Coating Formulation

Applicant has developed a polyfunctional alcohol water-based coating formulation that is compatible with the photocatalysts described in Section I. Applicants' coating is prepared by creating a solution comprising a polyfunctional alcohol, a metal carbonate, and a photocatalyst. The solution is applied to a surface to form a coating and dried. As the coating dries, a condensate forms that includes the photocatalyst.

The following Example is presented to further illustrate to persons skilled in the art how to make and use the invention. These Examples are not intended as a limitation, however, upon the scope of Applicants' invention.

A. Example 12

Applicants' coating is prepared using the components in the quantities provided in Table 16 to create a solution. The solution is then applied to a surface and heated to form the coating.

TABLE 16

| Component | Function | Quantity (wgt. %) |
|---|---|---|
| Tinolux BMC | Photocatalyst | 0.19 |
| Distilled Water | Coating Vehicle | 89.3 |
| Bacote 20 (20.3 wt % ZrO$_2$ solids) | Crosslinking Agent | 8.0 |
| Tetraethylene Glycol | Monomer | 1.6 |
| Amphosol HCG* (31% Actives) | Surfactant | 0.91 |

*Amphosol HCG is cocamidopropyl betaine sold in commerce by Stephan Company.

The coating solution was depositing onto a sample of Kappler ProVent 10,000 spun-bond protective polyolefin fabric that was pretreated with a urethane pre-coat. The coated sample was dried for 2 hours within a convection oven at 80° C. and subsequently cooled to room temperature.

Droplets of 98% chloroethyl ethyl sulfide (CEES), which is sold in commerce by Sigma-Aldrich, was deposited on the sample. CEES is a mustard gas analogue, commonly used to test the efficacy of compositions in decomposing CBAs. The coated sample was irradiated with light at an intensity of about 100,000 lux for 30 minutes. The sample was then washed with acetone to dissolve any soluble substances on the sample. The acetone solution was extracted and analyzed with Gas Chromatography-Mass Spectrometry (GC-MS).

Figure 20:
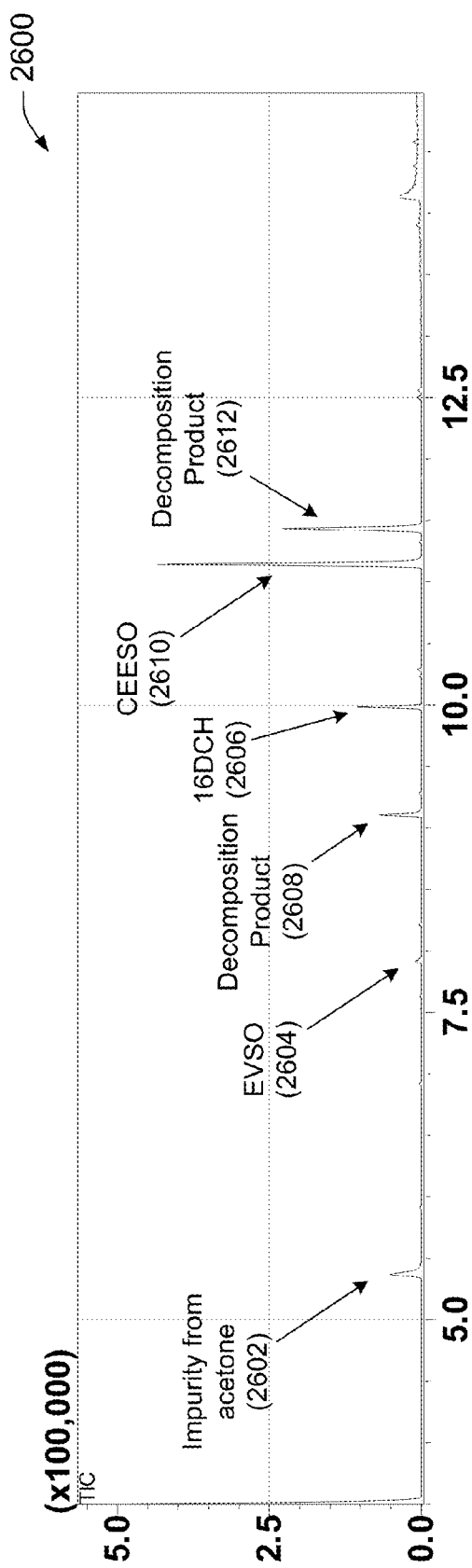
FIG. 20 is a gas chromatography-mass spectrometry chromatogram of Applicants' polyfunctional alcohol water-based self decontaminating coating formulation.

Referring to FIG. 20(a), a GC Chromatogram 2600 of the solution mixture extracted from the irradiated sample using acetone is depicted. Peaks in the GC Chromatogram 2600 represent components present in the acetone solution. The area under each peak represents the amount of the component present in the solution. Peak 2602 is an impurity present in the acetone. Peak 2606 represents 1,6-dichlorohexane, an impurity present in the commercial CEES product. Peaks 2608 and 2610 are additional products from the decomposition of CEES.

A large CEESO peak 2610 and the absence of a CEES peak indicate that all detectable amounts of CEES present has been oxidized. Another decomposition product of CEES present in a small quantity is ethyl vinyl sulfoxide, represented by peak 2604.

B. Example 13

Applicants' coating is prepared according to Example 12 above with the Bacote 20 replaced with Zirmel 20 based on a molar equivalent of zirconium. Zirmel is potassium zirconium carbonate and sold in commerce by MEL Chemicals. In different embodiments, a coating is formed on the surface of Kappler ProVent as described in Example 12, with or without a urethane pre-coat.

V. Functionalized Phosphate Ester Substituted Photocatalyst Coatings Formulation Applicant has developed photocatalyst compositions which become highly photoactive upon exposure to visible light and generate singlet oxygen from ambient air. Singlet oxygen has been shown to be a very effective oxidizing agent capable of decomposing both toxic chemicals as well as numerous biological pathogens/microbial species. The high chemical stability of Applicants' photocatalyst compositions enables them to continually produce singlet oxygen over a long time period without losing activity. Applicants have found these compounds to be effective for oxidizing CBA compounds.

Applicants' coating composition generates singlet oxygen using Reaction Scheme "A", below. Upon absorption of light, the photocatalyst undergoes electronic excitation to a singlet state followed by electron reorganization to form the excited triplet state. Triplet photocatalyst transfers energy to ambient triplet oxygen to form reactive singlet oxygen. The singlet oxygen generated ($^1O_2$), is the reactive species capable of oxidizing and decontaminating CBAs.

A. Reaction Scheme "A"

photocatalyst+light→$^1$photocatalyst→$^3$photocatalyst $^3$photocatalyst+$^3O_2$→photocatalyst+$^1O_2$ In various embodiments, Applicants' Photocatalyst Composition comprises a photocatalyst selected from the group consisting of substituted Acetonaphthones, substituted Acetophenone, substituted Acridines, substituted Anthracenes, substituted Anthraquinones, substituted Anthrones, substituted Azulenes, substituted Benzils, substituted Benzophenones, substituted Benzopyranones, substituted Benzoquinones, substituted Flavones, substituted Camphoroquinone, substituted Chrysenes, substituted 7-Dehydrocholesterols, substituted Ergosterols, substituted Fluorenes, substituted Fluorenones, substituted Eosins, substituted Fluoresceins, substituted Phloxines, substituted Rose Bengals, substituted Erythrosins, substituted Indoles, substituted Naphthalenes, substituted Phenanthrenes, substituted Phenazines, substituted Thionines, substituted Azures, substituted Toluidine Blue, substituted Methylene Blues, substituted Pyrenes, substituted Quinoxalines, substituted Retinols, substituted Riboflavins, substituted Rubrenes, substituted Bacteriochlorophylls, substituted Chlorophylls, substituted Pheophytins, substituted Pheophorbides, substituted Protochlorophylls, substituted Coproporphyrins, substituted Fullerenes, substituted Porphyrins, substituted Metallo Porphyrins, substituted Porphines, substituted Rubrenes, and substituted Phthalocyanines, The description herein is presented using a phthalocyanine compositions to illustrate the use of Applicants' functionalized phosphate ester photocatalyst compositions. Applicants' functionalized phosphate esters can be employed with a wide variety of metal-containing photocatalyst moieties, including the metal alkoxide/polyfunctional alcohol/photocatalyst and dicarboxylic acid/metal carbonate/photocatalyst coatings described herein. This being the case, the description herein employing phthalocyanine photocatalyst moieties should not be taken as limiting.

Figure 13:
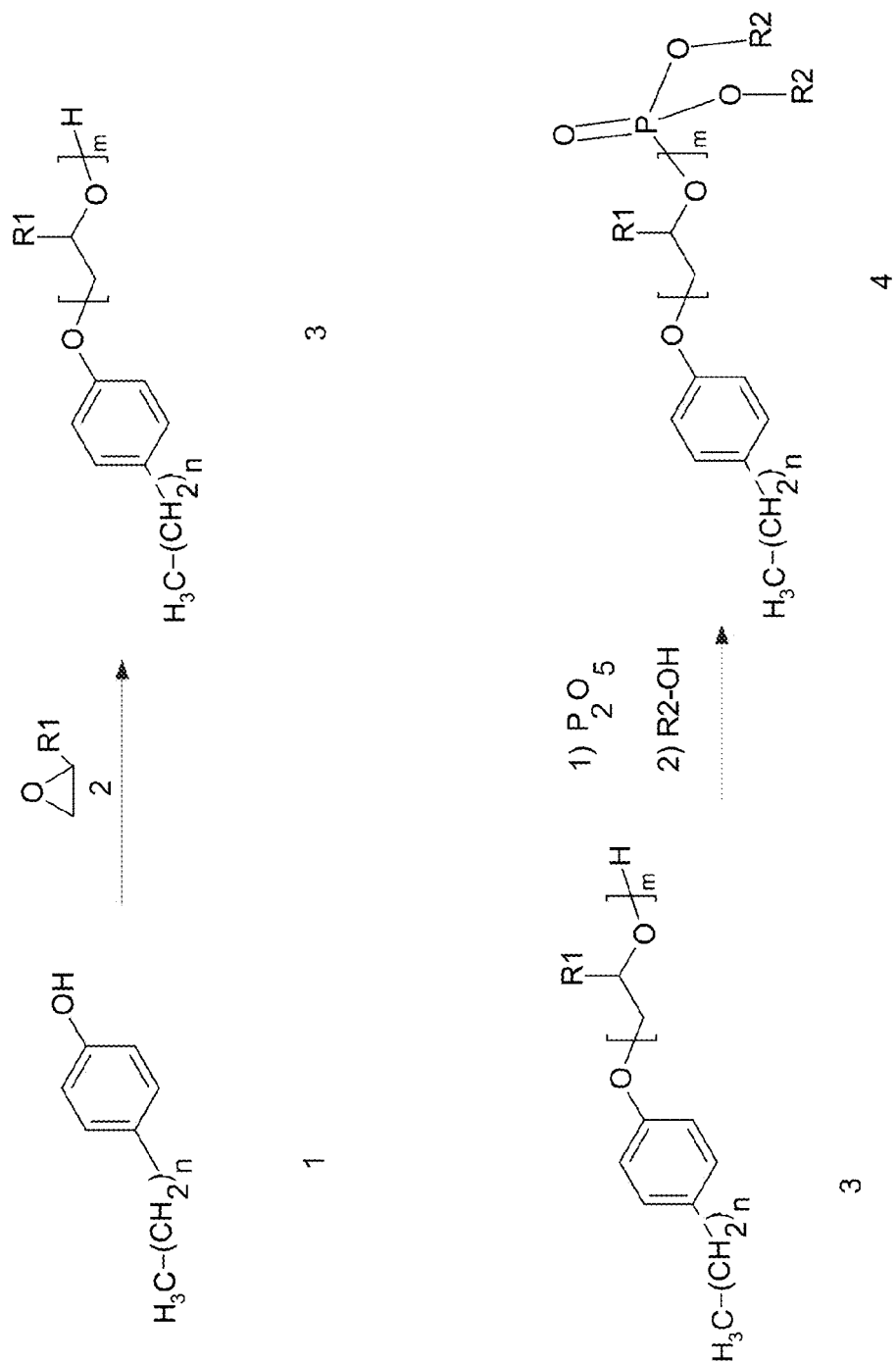
FIG. 13 shows the chemical reactions involved in producing a functionalized phosphate ester for use in one embodiment of Application's self decontaminating formulation.

Referring now to FIG. 13, in certain embodiments, substituted phenol 1 is reacted with an excess of one or more epoxides 2 to give polyether 3. In the illustrated embodiment of FIG. 13, substituted phenol 1 comprises a para-substituted alkyl group. In certain embodiments, n is 8. In certain embodiments, phenol 1 comprises a meta-substituted alkyl group. In certain embodiments, phenol 1 comprises an ortho-substituted alkyl group.

In certain embodiments, the substituted phenol 1 is reacted with ethylene oxide. In certain embodiments, the substituted phenol 1 is reacted with propylene oxide. In certain embodiments, the substituted phenol 1 is reacted with a mixture of ethylene oxide and propylene oxide. In certain embodiments, the substituted phenol 1 is first reacted with ethylene oxide and in a second step with propylene oxide.

Referring now to polyether 3, in certain embodiments m is about 6. In other embodiments, m is less than 6. In yet other embodiments, m is greater than 6.

Substituted polyether 3 is reacted with phosphorus pentoxide and then with an alcohol R2-OH to form functionalized phosphate ester 4. In certain embodiments, R2 is selected from the group consisting of methyl, ethyl, propyl, n-butyl, iso-butyl, 2-butyl, and combinations thereof.

Figure 15:
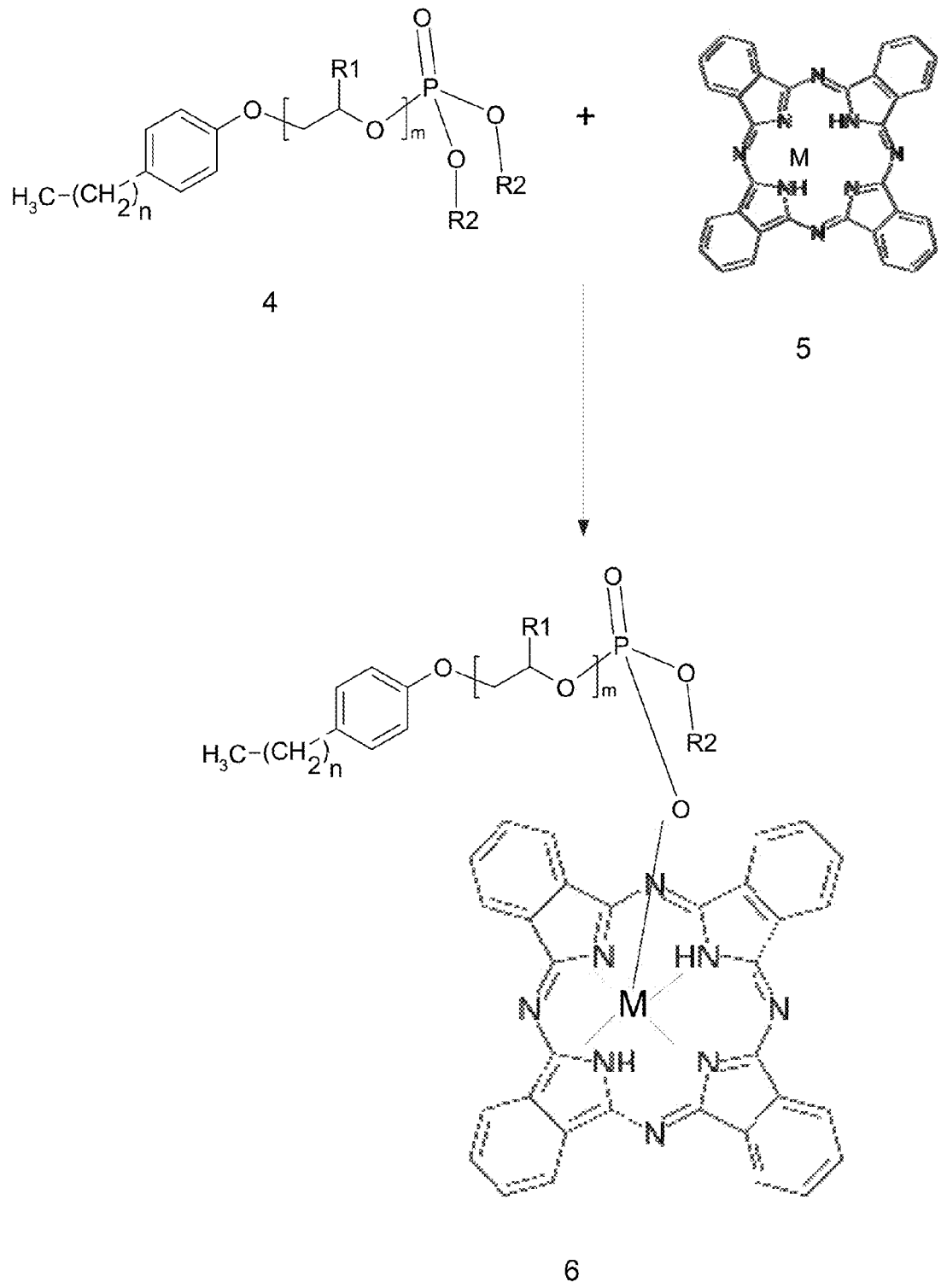
FIG. 15 shows the chemical reactions involved in producing a functionalized phosphate ester substituted phthalocyanine photocatalyst for use in one embodiment of Application's self decontaminating formulation.

Referring now to FIG. 15, phosphate ester 4 is reacted with metal phthalocyanine 5 to form functionalized phosphate ester substituted phthalocyanine photocatalyst 6. In certain embodiments, metal M comprises a metal cation. In certain embodiments, M is selected from the group consisting of aluminum, silicon, and zinc.

Figure 16:
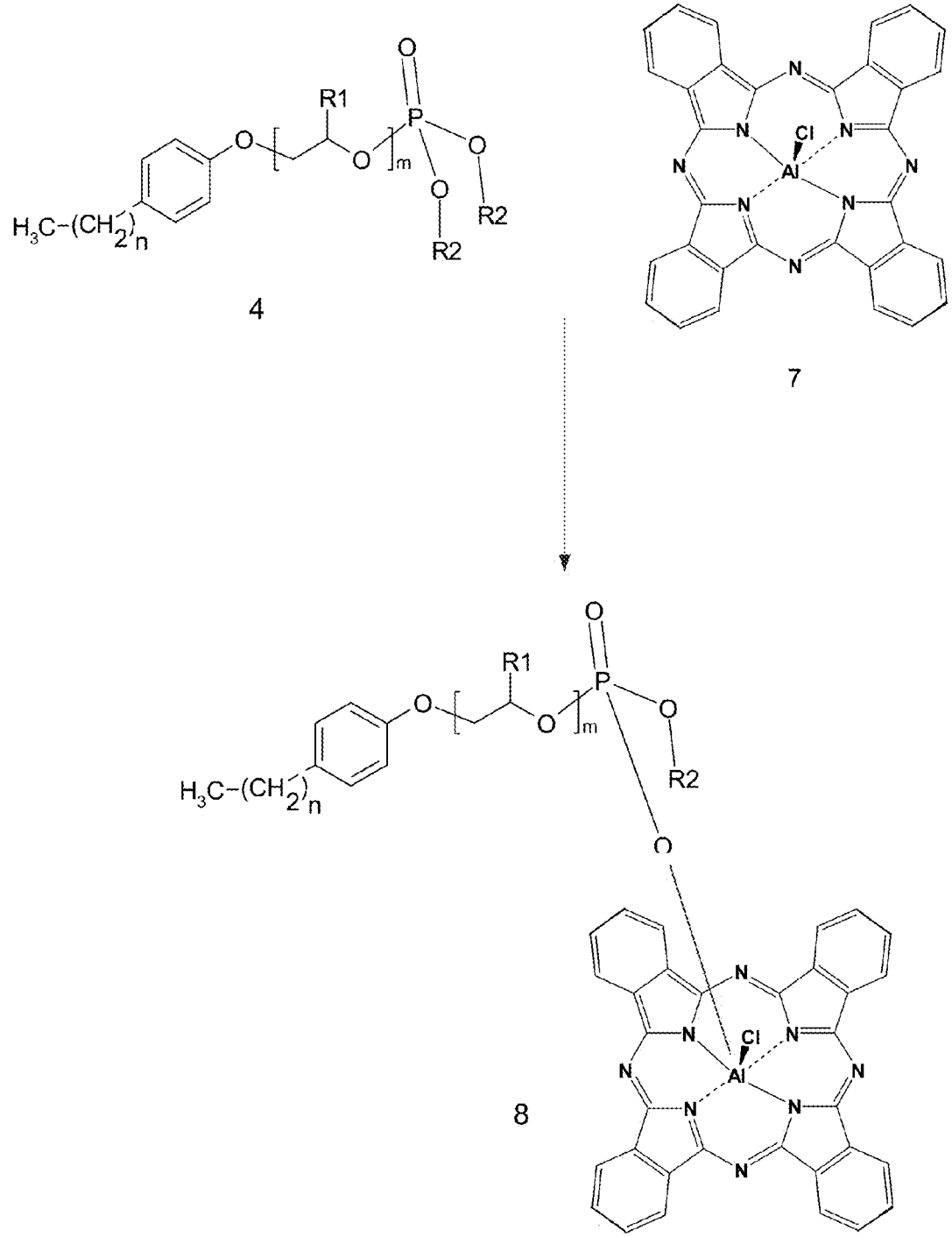
FIG. 16 shows the chemical reactions involved in producing another functionalized phosphate ester substituted phthalocyanine photocatalyst for use in one embodiment of Application's self decontaminating formulation.

Referring to FIG. 16, functionalized phosphate ester 4 is reacted with aluminum chloride phthalocyanine 7 to form functionalized phosphate ester substituted phthalocyanine photocatalyst 8.

In certain embodiments, Applicants' Photocatalyst Composition comprises one or more singlet oxygen scavengers, i.e., compounds that releasably trap singlet oxygen. Applicants have found that N-substituted-2-pyridones 10 trap singlet oxygen generated by Applicants' photocatalyst composition and ambient oxygen to give 1,4-endoperoxides 20. Applicant has further found that such N-substituted-2-pyridonyl endoperoxides 20 efficiently release singlet oxygen over time.

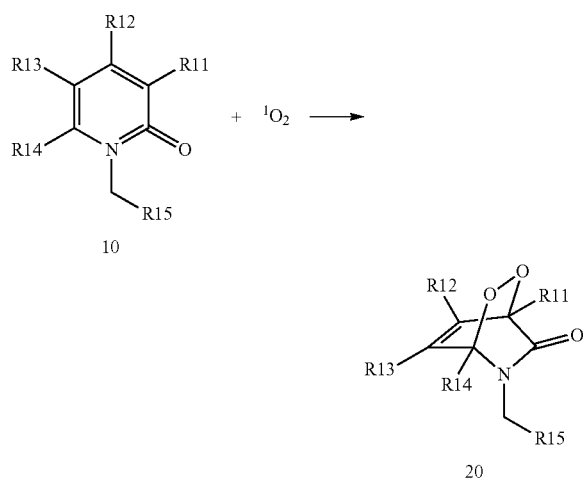

Figure 17:
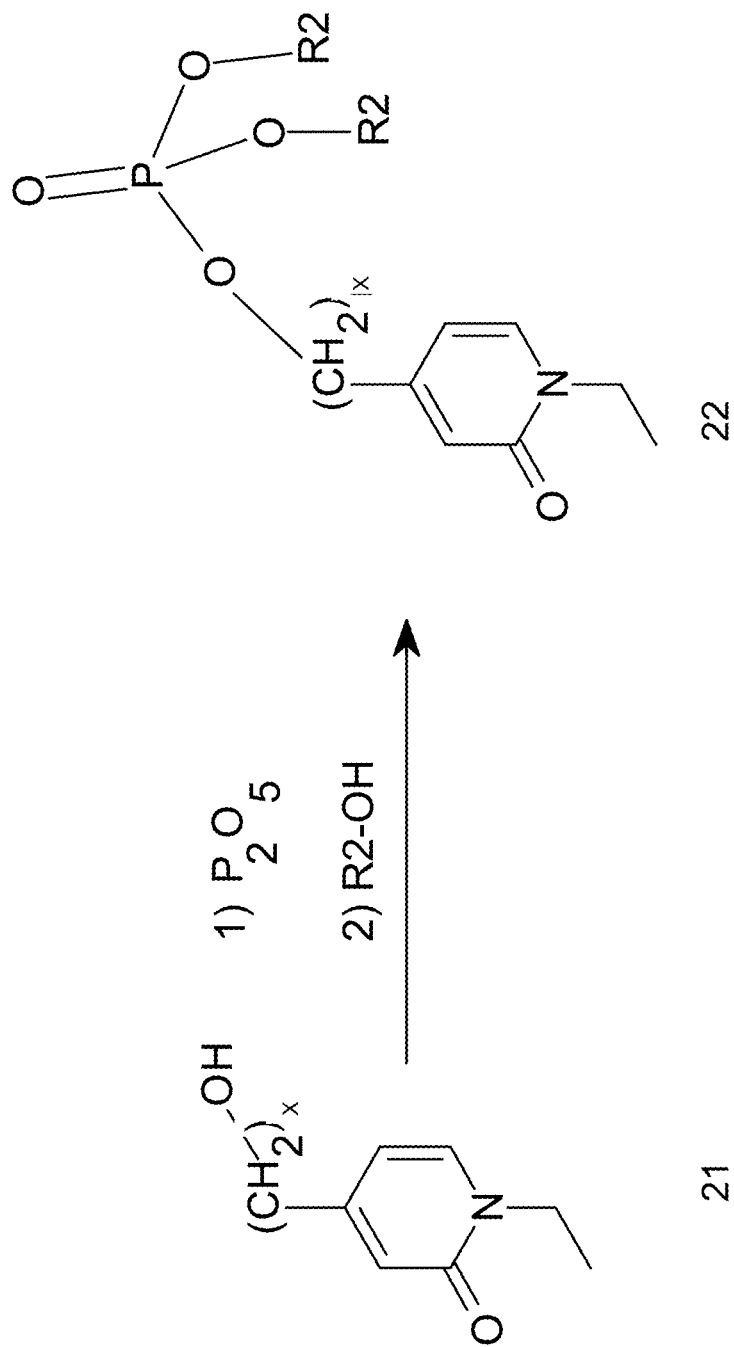
FIG. 17 shows the chemical reactions involved in producing a substituted pyridine photocatalyst for use in one embodiment of Application's self decontaminating formulation.
Figure 18:
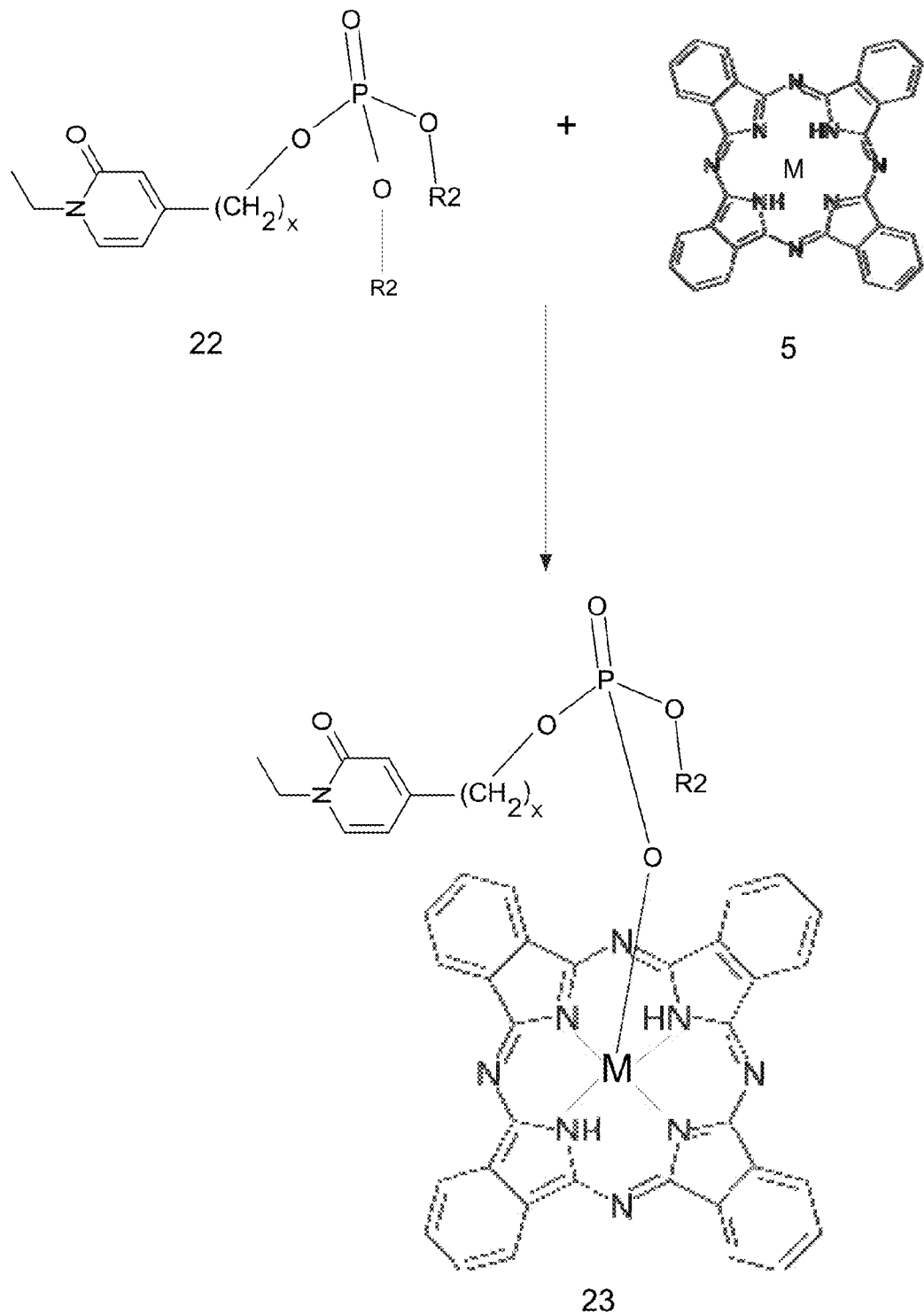
FIG. 18 shows the chemical reactions involved in producing a substituted aluminum phthalocyanine chloride photocatalyst with a substituted pyridone group for use in one embodiment of Application's self decontaminating formulation.

Referring now to FIG. 17, substituted 2-pyridone 21 is reacted with phosphorus pentoxide and then with an alcohol R2-OH to give phosphate ester 22 comprising a pendent N-substituted-2-pyridone 22. Referring to FIG. 18, phosphate ester 22 comprising a pendent N-substituted-2-pyridone 22 is reacted with metal phthalocyanine 5 to give photocatalyst 23 comprising a phosphate ester comprising a pendent N-substituted-2-pyridone.

Figure 19:
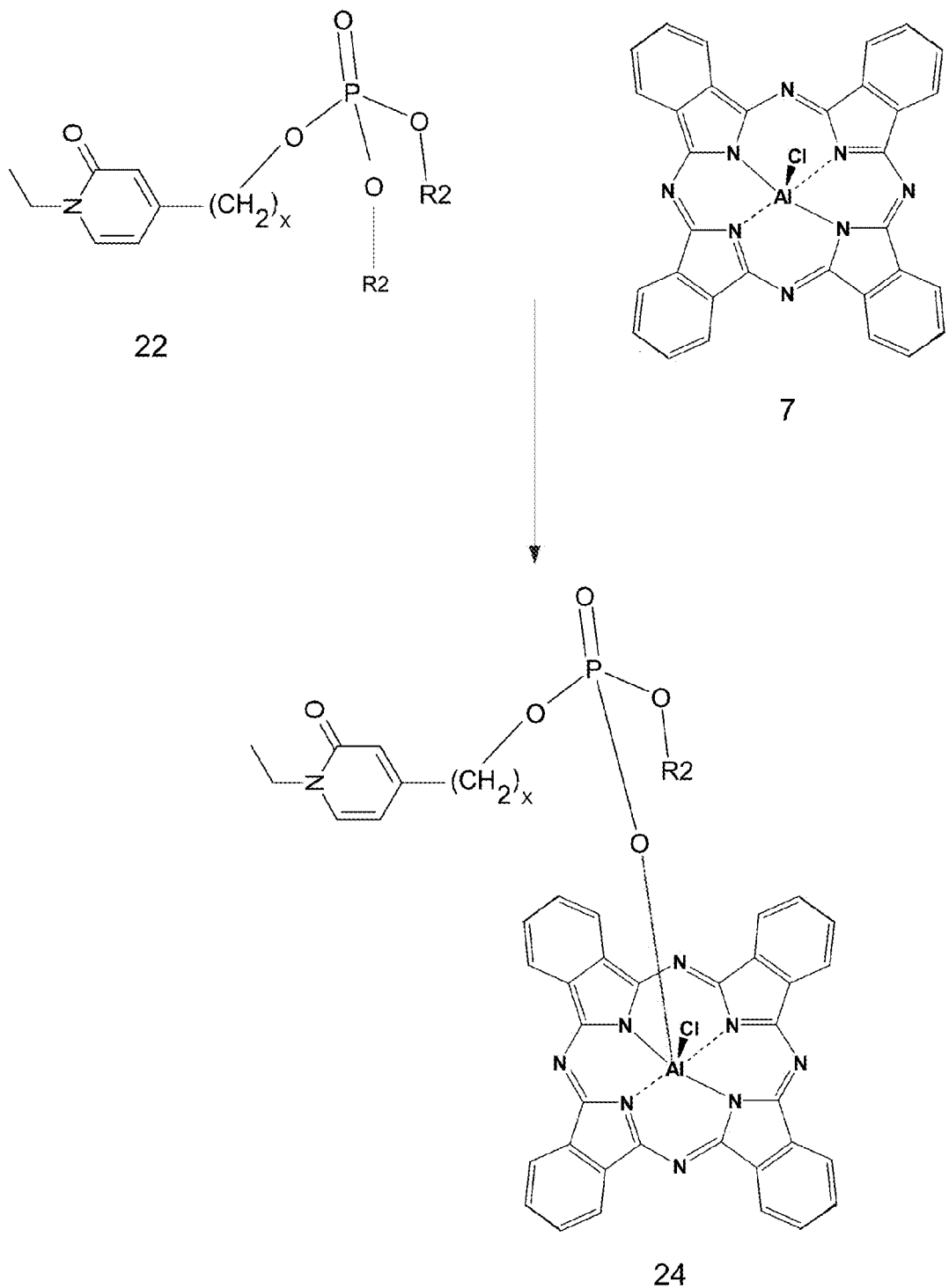
FIG. 19 shows the chemical reactions involved in producing a substituted metal phthalocyanine photocatalyst with a substituted pyridone group for use in one embodiment of Application's self decontaminating formulation.

Referring to FIG. 19, phosphate ester 22 comprising a pendent N-substituted-2-pyridone 22 is reacted with metal phthalocyanine 7 to give photocatalyst 24 comprising a phosphate ester comprising a pendent N-substituted-2-pyridone.

FIGS. 13 and 17 illustrate reacting a pendent hydroxyl group with phosphorus pentoxide and an alcohol to give a functionalized phosphate ester. These reactions should not be taken as limiting. In other embodiments, polyether 3 and/or N-substituted-2-pyridone 21 are reacted with phosphorus pentoxide and an alcohol to give phosphates 4 and 22, respectively.

In addition, FIGS. 13 and 17 show a mono-hydroxyl group containing compound being converted into a monophosphate. In other embodiments, Applicant utilized a diol and/or a triol to prepare a di-phosphate ester and/or a tri-phosphate ester. Moreover, in other embodiments Applicant utilizes a polyether comprising a terminal amino group to prepare a functionalized phosphate amide.

Applicant has disposed his functionalized phosphate ester substituted photocatalyst composition onto various substrates using conventional water-borne coating equipment and methods. The following Examples are presented to further illustrate to persons skilled in the art how to make and use the invention. These Examples are not intended as a limitation, however, upon the scope of Applicants' invention.

B. Example 14

In this Example Spunbond polypropylene sold in commerce by Kappler under the tradename Provent 1000 was employed as a coating substrate. The coating substrate was first pre-treated with a polyurethane pre-coating. For example and without limitation, WitCoBond UCX-281F sold in commerce by Chemtura was applied to the Provent 1000 surface in a 5% to about 10% w/w aqueous mixture. The polyurethane pre-coating was applied by either rolling or spraying. After application of the polyurethane pre-coating, the pre-coated Provent 1000 was allowed to dry at ambient condition overnight.

The above-described coating composition was then applied to the polyurethane precoated Provent 1000 by either rolling or spraying. The treated surface was dried at 100° C. for 1 to-2 minutes.

More specifically, two different polyether phosphates 4 were utilized, namely Dextrol OC-110 and Dextrol OC-15 sold in commerce by Ashland Chemicals. Table 17 summarizes the properties of these polyether phosphates.

TABLE 17

|  | Dextrol OC-110 | Dextrol OC-15 |
|---|---|---|
| Specific gravity | 1.099 | 1.089 |
| Moisture (%) | 0.64 | 0.10 |
| pH @10% solution | 2.5 | 2.4 |
| Nonionic content | 8 | 34 |
| Acid number at pH 5.5 | 98 | 57 |
| Acid number at pH 9.5 | N/A from COA (160-180 from product data) | 81 |
| Estimated mono/di ester ratio | 2.77* | 0.73** |

*estimated based on acid # 170 at pH 9.5

1. Preparation of Stock AlPc-Phosphate Ester Solution

An Aluminum chloride phthalocyanine ("AlPC") stock solution was prepared using OC-15, as follows:
(1.) 60 g of OC-15 was put into 250-ml round bottom flask with stirring bar and heated to 150-160° C.; and
(2.) 0.2 g AlPc was then added into heated OC-15 solution and stirring at 150-160° C. for ~60 minutes to get a homogeneous solution. A small drop of solution was checked using microscope for homogeneity every 20 minutes or so.

Similarly, an Aluminum chloride phthalocyanine ("AlPC") stock solution was prepared using 0° C.-110, as follows:
(1.) 60 g of 0° C.-110 was put into 250-ml round bottom flask with stirring bar and heated to 150-160° C.;
(2.) 0.2 g AlPc was then added into heated 0° C.-110 solution and stirring at 150-160° C. for ~150 minutes to get a homogeneous solution. A small drop of solution was checked using microscope for homogeneity every 20 minutes or so.

2. Preparation of Working Solution of AlPc-Phosphate Ester

An above-referenced stock solution was thinned down with solvent such as toluene (UV reagent grade ACS, Pharmco-AAPER), and anhydrous alcohol (Reagent grade, 90.65% EtOH, 4.53% MeOH, 4.82% IPA, Pharmco-AAPER) in the weight ratio of 3:1 (stock solution:solvent).

3. Preparation of Stock Solution of Aluminum Di(Isoproxide) Acetoacetic Ester Chelate Aluminum di(isoproxide) acetoacetic ester chelate was thinned down with toluene in the weight ratio of 3:4 (alkoxide:toluene).

4. Preparation of Coating Solution

The working solution of AlPc-phosphate ester was diluted with anhydrous alcohol to obtain a series of dye concentrations. Al alkoxide/toluene solution was then mixed with the diluted AlPC-phosphate ester working solution to prepare a coating solution. Typically 1:1 molar reaction stoichiometry between the phosphoric OH group and the alkoxy groups on chelated Al alkoxide was used.

5. Coating Provent 10000 with Primer

Primer used was 5% Witcobond W281-F. The dye coated fiber was dried in the oven for 26 minutes at 80° C.

Table 18 recites a first coating composition Formulation A. Table 19 recites a second coating composition Formulation B.

TABLE 18

(Formulation A: Moles of alkoxy group was enough to take the first H from phosphoric OH)

| Component | Concentration (Wt %) |
|---|---|
| AlPc | 0.024 |
| OC-15 | 7.29 |
| Anhydrous alcohol | 90.16 |
| Toluene | 1.44 |
| aluminum di(isoproxide) acetoacetic ester chelate | 1.09 |

TABLE 19

(Formulation B: (Moles of alkoxy group was enough to take all the H from phosphoric OH)

| Component | Concentration (Wt %) |
|---|---|
| AlPc | 0.024 |
| OC-15 | 7.22 |
| Anhydrous alcohol | 89.29 |
| Toluene | 1.99 |
| aluminum di(isoproxide) acetoacetic ester chelate | 1.49 |

C. Example 15

Applicants' AlPc-MAPHOS 8135-Aluminum alkoxide Coating Formulation was testing using the following parameters:

Swatch sample 1×1 inch in 250 mL screw cap jar

Chloroethyl ethylsulfide (CEES) loading; 5 µL

Irradiation; Xe arc 150 W with hot mirror and >495 nm filter

Light intensity ~100,000 lux

Irradiation time; 60 min

Dimethyl sulfoxide internal standard (5 µL) was added after irradiation

Acetone was used in the recovery process

GC-MS; Shimadzu mass spectrometer QP2010S coupled with Shimadzu gas chromatograph GC2010

GC-Column; Restek-Rxi®XLB fused silica column

GC condition; 60° C. (5 min), 20° C./min to 160° C. (2 min), 20° C./min to 250° C. (20 min)

Figure 21:
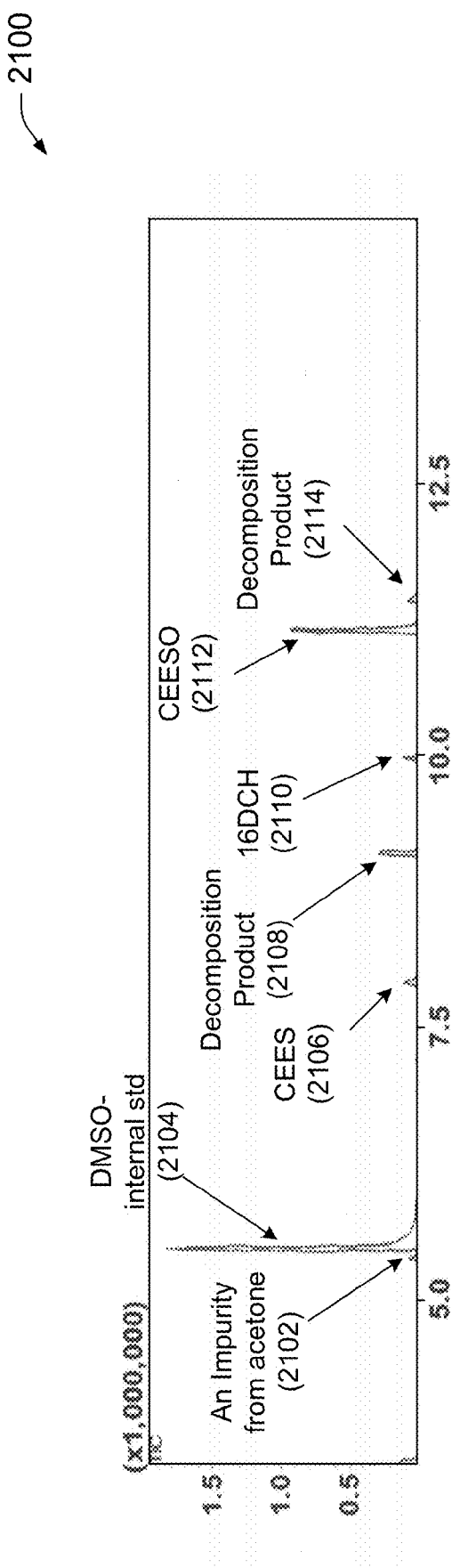
FIG. 21 is a gas chromatography-mass spectrometry chromatogram of Applicants' functionalized phosphate ester substituted photocatalyst self decontaminating coating formulation.

Referring to FIG. 21, a GC Chromatogram 2100 of the solution mixture extracted using acetone from the irradiated sample, which was treated with Applicants' AlPc-MAPHOS 8135-Aluminum alkoxide Coating Formulation, is depicted.

Peaks in the GC Chromatogram 2100 represent components present in the acetone solution. The area under each peak represents the amount of the component present in the solution. Peak 2104 represents dimethyl sulfoxide, an internal standard used to adjust the measurement peaks based on a known quantity. Peak 2102 represents an impurity from the acetone. Peak 2656 represents 1,6-dichlorohexane, an impurity present in the commercial CEES product. Peaks 2108 and 2114 are additional products from the decomposition of CEES.

A large CEESO peak 2112 and the small CEES peak 2106 indicate that a high percentage of the CEES applied to the sample has been oxidized.

Figure 22:
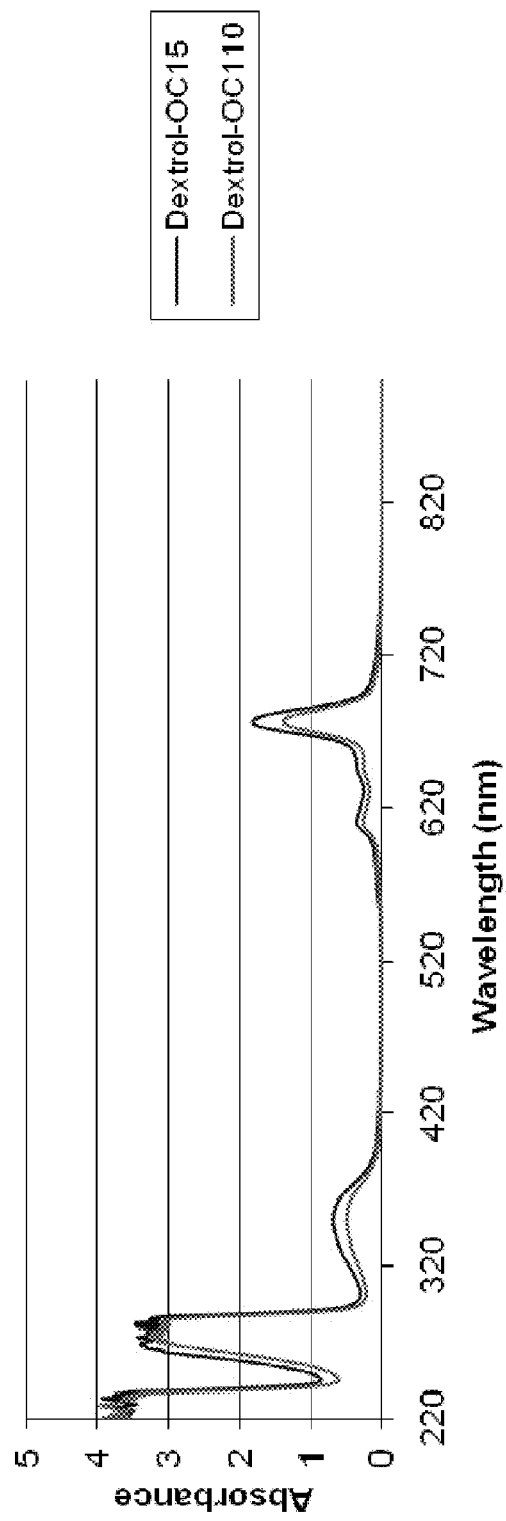
FIGS. 22 and 23 are IR spectra of various embodiments of Applicants' functionalized phosphate ester substituted aluminum phthalocyanine chloride photocatalyst self decontaminating coating formulation.

Referring to FIG. 22, an IR spectrum of the AlPc-Cl/phosphate ester formulation in water is depicted. $\lambda_{max}$ in visible region=676 nm in both cases.

Figure 23:
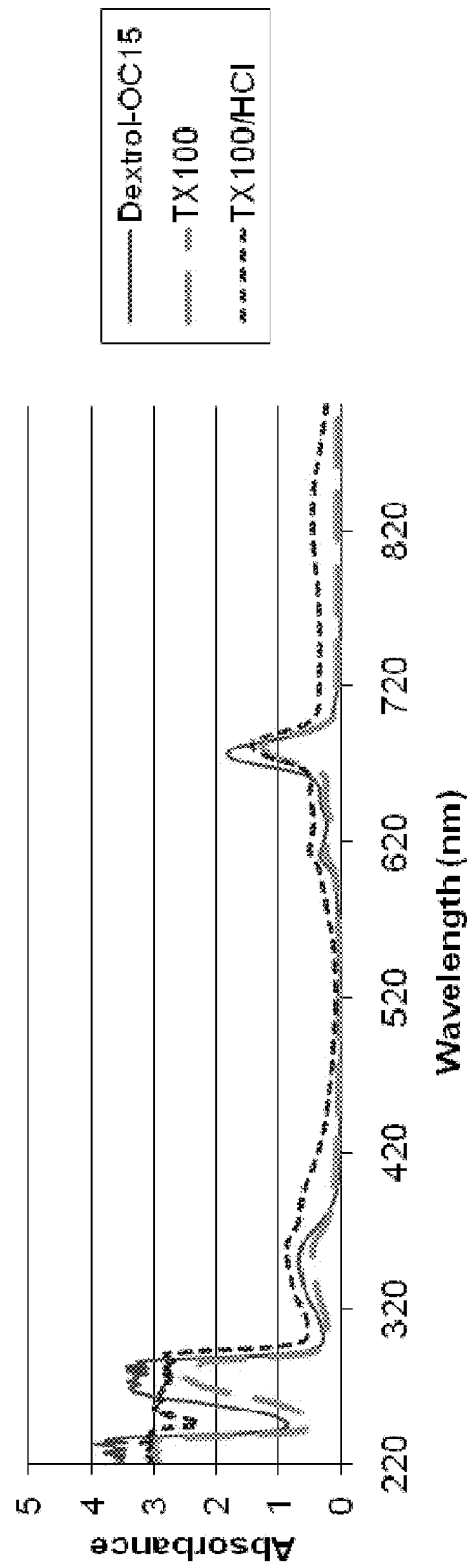

Referring to FIG. 23, an IR spectrum of the AlPc-Cl/phosphate ester formulation in water and in TX100 is depicted. $\lambda_{max}$ in visible region for OC-15=676 nm; for TX100=680 nm; and for TX100/HCl=681 nm.

While the preferred embodiments of the present invention have been illustrated in detail, it should be apparent that modifications and adaptations to those embodiments may occur to one skilled in the art without departing from the scope of the present invention as set forth in the following claims.

I claim:

1. A self-decontaminating coating prepared by a method comprising:
   preparing a coating solution by combining a photocatalyst dissolved in an alcohol, and a powder metal alkoxide not dissolved in a solvent, wherein said coating solution further comprises tetrabromophthalic anhydride and diglycolamine;
   applying the coating solution to a surface; and
   drying the surface.

2. The self-decontaminating coating of claim 1, wherein said alcohol is ethanol.

3. The self-decontaminating coating of claim 1, wherein said photocatalyst is selected from the group consisting of an Acetonaphthone, an Acetophenone, an Acridine, an Anthracene, an Anthraquinone, an Anthrone, an Azulene, a Benzils, a Benzophenones, a Benzopyranones, a Benzoquinones, a Flavones, a Camphoroquinone, a Chrysenes, a 7-Dehydrocholesterols, Ergosterols, a Fluorenes, a Fluorenones, Eosins, a Fluoresceins, a Phloxines, a Rose Bengals, Erythrosins, Indoles, a Naphthalenes, a Phenanthrenes, a Phenazines, a Thionines, Azures, a Toluidine Blue, a Methylene Blues, a Pyrenes, a Quinoxalines, a Retinols, a Riboflavins, a Rubrenes, a Bacteriochlorophylls, a Chlorophylls, a Pheophytins, a Pheophorbides, a Protochlorophylls, a Coproporphyrins, a Fullerenes, a Porphyrins, a Metallo Porphyrins, a Porphines, a Rubrenes, and a Phthalocyanine.

4. The self-decontaminating coating of claim 3, wherein said photocatalyst comprises a phthalocyanine.

5. The self-decontaminating coating of claim 3, wherein said phthalocyanine comprises a metalated phthalocyanine.

6. The self-decontaminating coating of claim 5, wherein:
   said metalated phthalocyanine comprises an aluminum phthalocyanine; said metal alkoxide comprises an aluminum alkoxide.

7. The self-decontaminating coating of claim 1, wherein said method further comprises prior to said applying step, disposing a polyurethane coating onto said surface.

8. The self-decontaminating coating of claim 7, wherein said method further comprises after said disposing and before said applying, drying said surface at ambient temperature.

9. A self-decontaminating fabric prepared by a method comprising:
   preparing a coating solution by combining a solution comprises a photocatalyst dissolved in an alcohol, and a powder metal alkoxide not dissolved in a solvent, wherein said solution further comprises tetrabromophthalic anhydride and diglycolamine;
   applying the coating solution to a fabric; and
   drying the fabric.

10. The self-decontaminating fabric of claim 9, wherein said alcohol is ethanol.

11. The self-decontaminating fabric of claim 9, wherein said photocatalyst is selected from the group consisting of an Acetonaphthone, an Acetophenone, an Acridine, an Anthracene, an Anthraquinone, an Anthrone, an Azulene, a Benzils, a Benzophenones, a Benzopyranones, a Benzoquinones, a Flavones, a Camphoroquinone, a Chrysenes, a 7-Dehydrocholesterols, Ergosterols, a Fluorenes, a Fluorenones, Eosins, a Fluoresceins, a Phloxines, a Rose Bengals, Erythrosins, Indoles, a Naphthalenes, a Phenanthrenes, a Phenazines, a Thionines, Azures, a Toluidine Blue, a Methylene Blues, a Pyrenes, a Quinoxalines, a Retinols, a Riboflavins, a Rubrenes, a Bacteriochlorophylls, a Chlorophylls, a Pheophytins, a Pheophorbides, a Protochlorophylls, a Coproporphyrins, a Fullerenes, a Porphyrins, a Metallo Porphyrins, a Porphines, a Rubrenes, and a Phthalocyanine.

12. The self-decontaminating fabric of claim 11, wherein said photocatalyst comprises a phthalocyanine.

13. The self-decontaminating fabric of claim 11, wherein said phthalocyanine comprises a metalated phthalocyanine.

14. The self-decontaminating fabric of claim 13, wherein:
   said metalated phthalocyanine comprises an aluminum phthalocyanine; said metal alkoxide comprises an aluminum alkoxide.

15. The self-decontaminating fabric of claim 9, wherein said method further comprises prior to said applying step, disposing a polyurethane fabric onto said fabric.

16. The self-decontaminating fabric of claim 15, wherein said method further comprises after said disposing and before said applying, drying said fabric at ambient temperature.

* * * * *